(12) United States Patent
Kazerouni et al.

(10) Patent No.: US 7,930,368 B2
(45) Date of Patent: Apr. 19, 2011

(54) METHODS AND SYSTEMS FOR USE IN CUSTOMIZING DISPLAYED CONTENT ASSOCIATED WITH A PORTABLE STORAGE MEDIUM

(75) Inventors: Babak Kazerouni, Irvine, CA (US); Sherry Kao, Pasadena, CA (US)

(73) Assignee: Deluxe Digital Studios, Inc., Burbank, CA (US)

( * ) Notice: Subject to any disclaimer, the term of this patent is extended or adjusted under 35 U.S.C. 154(b) by 298 days.

(21) Appl. No.: 12/181,138

(22) Filed: Jul. 28, 2008

(65) Prior Publication Data
US 2009/0063659 A1 Mar. 5, 2009

Related U.S. Application Data

(63) Continuation of application No. PCT/US2008/071274, filed on Jul. 26, 2008.

(60) Provisional application No. 60/952,509, filed on Jul. 27, 2007.

(51) Int. Cl.
  G06F 15/16 (2006.01)
  G06F 3/00 (2006.01)
  G06F 13/00 (2006.01)
  H04M 1/00 (2006.01)

(52) U.S. Cl. .......... 709/219; 709/203; 725/37; 715/762; 455/556.2

(58) Field of Classification Search .................. None
See application file for complete search history.

(56) References Cited

U.S. PATENT DOCUMENTS

| 7,366,991 B1 * | 4/2008 | Snapkauskas et al. ........ 715/762 |
| 2002/0033840 A1 | 3/2002 | Masthoff et al. |
| 2004/0106438 A1 | 6/2004 | Chen |
| 2004/0242269 A1 * | 12/2004 | Fadell ......................... 455/556.2 |
| 2005/0028196 A1 * | 2/2005 | Adachi et al. .................... 725/37 |
| 2005/0160458 A1 * | 7/2005 | Baumgartner .................. 725/46 |
| 2007/0142094 A1 | 6/2007 | Enns et al. |

FOREIGN PATENT DOCUMENTS

| KR | 1020050003836 | 1/2005 |
| KR | 1020060036991 | 5/2006 |

OTHER PUBLICATIONS

International Search Report and Written Opinion of the International Searching Authority from PCTUS2008071274 mailed Feb. 16, 2009.

* cited by examiner

Primary Examiner — Wen-Tai Lin
(74) Attorney, Agent, or Firm — Fitch, Even, Tabin & Flannery

(57) ABSTRACT

The present embodiments provide methods and systems to playback and customize the playback of content relative to the portable storage medium. Some of these methods identify content to be rendered, through a playback device, in association with a first portable storage medium; identify one or more customizable display parameters to be applied in displaying the identified content; receive a first definition, following the identification of the customizable display parameters, for at least a first customizable display parameter of the one or more customizable display parameters; and cause the first definition for the first customizable display parameter to be stored on the playback device in association with the first customizable display parameter such that the first definition is to be applied by the playback device in rending the content relative to the first customizable display parameter.

9 Claims, 14 Drawing Sheets

```
...                                                      1030
         ButtonRegion scenesNormal = new ButtonRegion(
      imageRegions[LXGImageRegionPlot.SCENES_BACKGROUND], font, scenes,
NORMAL_X_OFFSET_ONELINERS, NORMAL_Y_OFFSET_ONELINERS, 0);

ButtonRegion setupNormal = new ButtonRegion(      1031
      imageRegions[LXGImageRegionPlot.SETUP_BACKGROUND], font, setup,
NORMAL_X_MIDDLE_OFFSET_ONELINERS, NORMAL_Y_OFFSET_ONELINERS, 0);

ButtonRegion specialFeatNormal = new ButtonRegion(    1032
      imageRegions[LXGImageRegionPlot.SPECIALFEATRUES_BACKGROUND], font,
specialFeatures, NORMAL_X_OFFSET_DOUBLELINERS,
NORMAL_Y_OFFSET_DOUBLELINERS,SPECIAL_LINE_SPACE);

ButtonRegion playNormal = new ButtonRegion(
      imageRegions[LXGImageRegionPlot.PLAY_BACKGROUND], font, play,
NORMAL_X_OFFSET_ONELINERS, NORMAL_Y_OFFSET_ONELINERS, 0);
...
```

1020 ↘

---

```
...
public static final byte BACKGROUND_CROSS = 0;

public static final byte SETUP_BACKGROUND = 1;

public static final byte SPECIALFEATRUES_BACKGROUND = 2;

public static final byte SCENES_BACKGROUND = 3;

...                    1041              1042
imageRegions[BACKGROUND_CROSS] = new ImageRegion(
      images[LXGCompositeImageInfo.MENUS_2], 0, 0, 47, 24, 763, 1048);
   imageRegions[SETUP_BACKGROUND] = new ImageRegion(
      images[LXGCompositeImageInfo.MENUS_2], 0, 387, 852 + 60, 577,
      483 - 60, 112);
imageRegions[SPECIALFEATRUES_BACKGROUND] = new ImageRegion(
      images[LXGCompositeImageInfo.MENUS_2], 0, 516, 852 + 60, 690,
      483 - 60, 115);
imageRegions[SCENES_BACKGROUND] = new ImageRegion(
      images[LXGCompositeImageInfo.MENUS_2], 0, 251, 850 + 60, 347,
      548 - 60, 114);
...                       1040
```

METHODS AND SYSTEMS FOR USE IN CUSTOMIZING DISPLAYED CONTENT ASSOCIATED WITH A PORTABLE STORAGE MEDIUM

PRIORITY CLAIM

This application claims the benefit of U.S. Provisional Application No. 60/952,509, filed Jul. 27, 2007, entitled METHODS AND SYSTEMS FOR USE IN CUSTOMIZING DISPLAYED CONTENT FROM A PORTABLE STORAGE MEDIUM; and this application is a continuation of International Application No. PCT/US08/71274, filed Jul. 26, 2008, entitled METHODS AND SYSTEMS FOR USE IN CUSTOMIZING DISPLAYED CONTENT ASSOCIATED WITH A PORTABLE STORAGE MEDIUM, which claims the benefit of U.S. Provisional Application No. 60/952,509, filed Jul. 27, 2007, entitled METHODS AND SYSTEMS FOR USE IN CUSTOMIZING DISPLAYED CONTENT FROM A PORTABLE STORAGE MEDIUM, all of which are incorporated herein by reference in their entirety.

FIELD OF THE INVENTION

The present invention relates generally to portable digital processor readable storage mediums, and more particularly to providing access to content stored on a portable digital processor readable storage medium.

BACKGROUND

Over the last several decades the distribution of content, such as multimedia content, images, video, music and other such content, has increased tremendously. There are a number of different formats for distributing content as well as a number of different mediums upon which content can be stored. Over the last few decades digital recordings of content has become the preferred mode of storing content according to some applications.

Large amounts of digital data can be recorded to some mediums capable of receiving digital content. With some recording additional content is recorded to provide navigation through the content recorded on the medium. This navigation allows the user to interact with the content, such as locate desired content, skip portions of content, and perform other navigation.

SUMMARY OF THE EMBODIMENT

The present invention advantageously addresses the needs above as well as other needs through the provision of the methods, apparatuses, and systems for use in providing customization in displaying content retrieved from a portable storage medium. Some embodiments provide methods of displaying content in association with a portable storage medium. Some of these methods identify content to be rendered, through a playback device, in association with a first portable storage medium to be directly accessed by the playback device; identify one or more customizable display parameters to be applied in displaying the identified content; receive a first definition, following the identification of the one or more customizable display parameters, for at least a first customizable display parameter of the one or more customizable display parameters; and cause the first definition for the first customizable display parameter to be stored on the playback device in association with the first customizable display parameter such that the first definition is applied by the playback device in rending the content relative to the first customizable display parameter.

Additional embodiments provide methods of playing back content to be played back in association with a portable storage medium. Some of these methods receive a command to customize display parameters; access a first portable storage medium; identify one or more customizable display parameters, defined on the first portable storage medium, that can be applied while displaying a first content associated with the first portable storage medium; display at least one of the one or more customizable display parameter; detect a designation of a first definition for a first customizable display parameter, of the displayed at least one of the one or more customizable display parameter, alter a state of the first customizable display parameter from a first state to a second state; store the first definition, in response to detecting the designation of the first definition altering the state of the first customizable display parameter to the second state; display the first content in association with the first portable storage medium while applying the first definition of the first customizable display parameter according to the second state.

Further embodiments provide methods of rendering content. Some of these embodiments receive, from over a network, an identification of content, recorded on a portable storage medium being directly accessed by a remote playback device, to be played back by the remote playback device; identify, according to the identification of the content, one or more display parameters associated with the content, where the one or more display parameters are customizable to alter the playing back of the content at the remote playback device; identify one or more associated definitions for each of the one or more display parameters, where the associated definitions dictate at least in part how the content is played back relative to the associated one or more display parameters; and communicate, over the network, the one or more definitions to the remote playback device to be applied by the playback device, in association with corresponding one or more display parameters specified at the remote playback device, in altering the playback of the content at the remote playback device from a playback of the content without the one or more definitions.

Still further embodiments provide computer readable portable storage mediums having recorded thereon code that in part controls the playback of content to be played back in association with the computer readable portable storage medium. The code when implemented by an appropriately configured processor accessing the code from the computer readable portable storage medium causes the processor to access content to be played back by a playback device in association with a computer readable portable storage medium being directly accessed by the playback device, and to identify a plurality of display parameters, defined on the computer readable portable storage medium, associated with the content that dictate at least in part how the content is displayed. Further, the processor identifies, for each of the identified plurality of display parameters, one or more associated parameter definitions, including a first default parameter definition associated with a first display parameter; determines whether a customized parameter definition associated with the first display parameter is specified, on a separate computer readable medium accessible by the playback device, to be utilized in displaying the content; plays back the content while applying the customized parameter definition for the first display parameter in place of the first default parameter definition when the customized parameter definition is specified; and plays back the content applying the first default parameter definition defined on the computer readable portable storage medium when the customized parameter definition is not defined.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 10 depicts a simplified textual representation of an example of a portion of code recorded on a portable storage medium that is utilized when displaying, for example, a menu, and a portion of a definition file accessed by the playback device when implementing the code;

Figure 1:
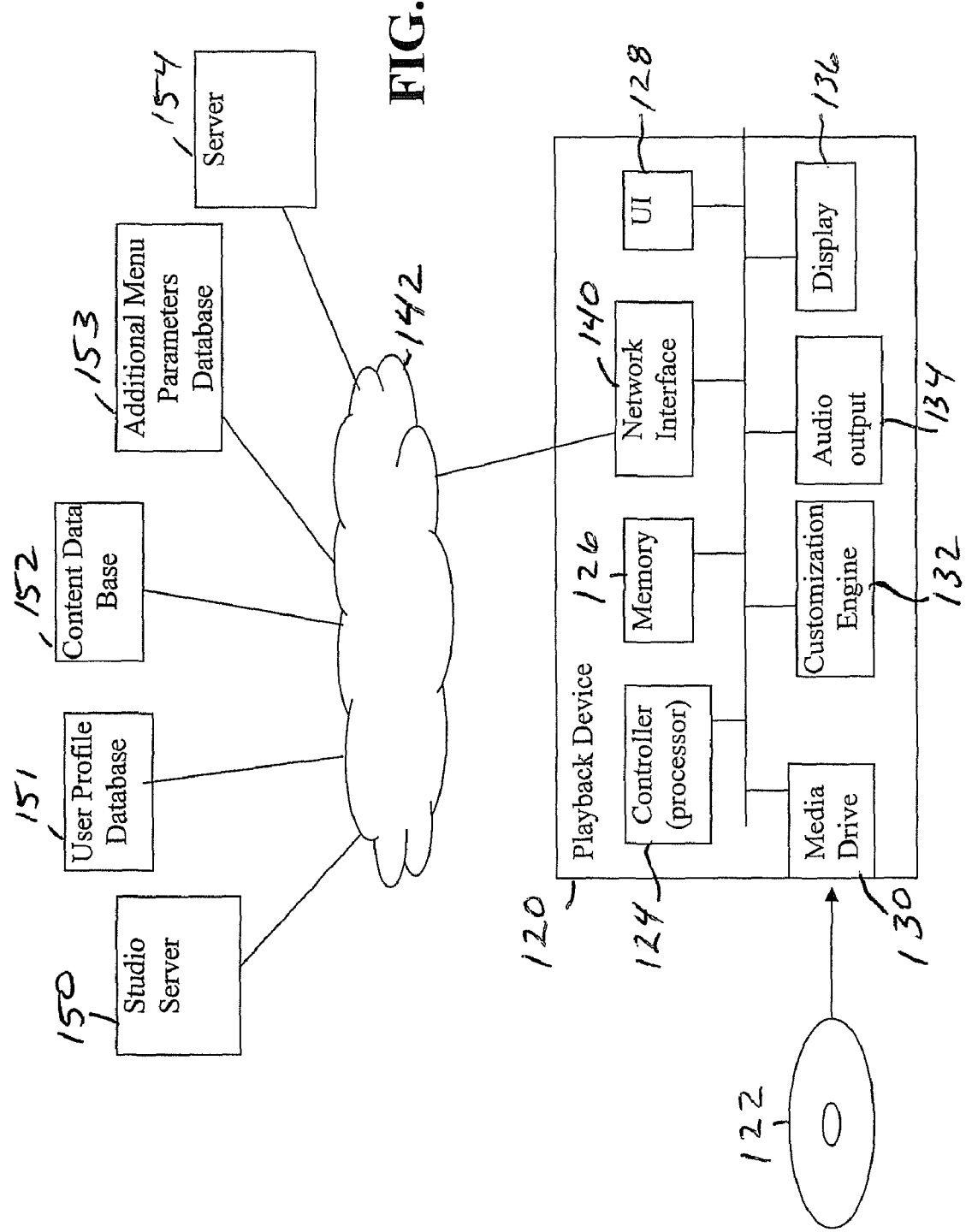
FIG. 1 depicts a simplified block diagram of a playback system or device according to some embodiments that plays back content accessed and/or retrieved from a portable storage medium.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments allow customization of a playback experience associated with content retrieved from a digital data storage medium that is readable by a processor, computer or other relevant device. The customization can utilize and apply many factors, parameters, definitions, effects, content, operations, conditions, security, rules and the like that can be defined, adjusted, altered and/or incorporated, referred to generally as parameters. In playing back the content the customization is identified and the content is displayed and/or played back according to the customization when appropriate. The medium often is an optical data storage medium, such as a high definition digital video disc (HD-DVD), Blu-ray disc or other such optical data storage. In part, the storage capacity provided by the HD-DVD and Blu-ray discs allow for additional content, data, parameters, conditions, code, scripts and the like along with multimedia content such that as the multimedia content is displayed the customization can in part dictate how that content is displayed.

To simplify the explanation below the customization is generally described relative to parameters. It will be apparent to those skilled in the art, however, that the customization can apply to other aspects of the content, the displaying of content, the playback of content, the operation of the playback and playback device, the incorporation of content and the like. Additionally, the customization described below is generally described for simplicity as being customization relative to the customization of content on the medium, which can include multimedia content, graphical content, menu content and other such content; however, it will be apparent to those skilled in the art that the customization is not limited to the content on the medium but can also apply to content accessed in addition to the content on the medium, conditions and settings of the playback device, rules applied relative to content (which can include, for example, whether certain content can be displayed), content to be played back in association with the medium, and other such customization. Further for simplicity, the customization is generally described relative to a user. Customization can be utilized by the end user who is accessing and/or playing back the content; however, customization is not limited to the end user but instead can be utilized by content owners, content distributors and others associated with the content and the distribution of the content or supplemental content that can be associated with the content.

The customization can allow a user to define how content is played back, an appearance of user interfaces, user interface menus, locations of menus, when and how the menus are displayed, specify behavior characteristics, define assets (e.g., a language to apply, whether sub-titles are displayed, and the like), options available, distributing of content and other such customization. As one example, the customization can provide a user with the ability to dictate an appearance of a menu based on customizable menu display parameters. This can include, for example, the overall size of the menu, where on the display screen the menu is to be displayed, the size of the options or buttons in the menu, the size of the fonts used when appropriate, the number of options available through the menu, coloring, graphics, graphical skinning, background, audio played back while the menu is displayed, audio indications when options have been selected and/or errors are detected, and other such aspects and appearance of the menu. Parameters can be specified in the medium and the definitions for the parameter can be determined at the time of displaying the content (e.g., a menu). A user can define a parameter such that at the time the content (a menu in this example) is displayed the playback device utilizes the definition for the parameter specified by the user. Similarly, a remote source and/or party can specify a customized definition for the parameter that can be utilized at the time of displaying the menu. Further, additional parameters can be specified and/or received from a remote source and definitions can be specified to be applied when rendering content.

FIG. 1 depicts a simplified block diagram of a playback system or device 120, according to some embodiments, that plays back content accessed and/or retrieved from a portable storage medium 122. The playback device 120 includes a controller 124, memory 126, user interface 128, medium drive 130, customization engine 132, audio output 134, a display 136 and one or more communication links or buses 138. In some embodiments, the playback device further includes a network interface 140 that allows the playback device to communicate over a network 142 with remote devices and/or sources 150-154.

The controller 124 can be implemented through one or more processors, microprocessors, minicomputers or other such processing devices or combinations of devices appropriately configured to access and implement code, software, scripts and the like to implement the customization and/or direct other components of the playback device 120 to implement the customization. In some embodiments, the controller includes video and/or audio processing functionality, such as decoders, encoders and the like; however, the video and/or audio processing functionality can be implemented through separate devices cooperated with the controller 124. In many instances, the controller can utilize and/or implement the use of content protection, such as encryption, decryption or other such protection processing. Further, the controller 124 and/or one or more processors of the playback device can implement software recorded on the medium 122, the memory 126 or received over the network 142. The memory 126 is coupled with the controller and typically includes one or more processor and/or computer-readable media accessed by at least the controller 124 and can include volatile and/or nonvolatile media, such as RAM, ROM, EEPROM, flash memory or other memory technology. The memory can store code, software, executables, scripts, data, profiles, and the like. In some embodiments, the memory stores software that implements application user interfaces providing a user with a graphical user interface to define and/or implement customization as fully described below.

The user interface 128 allows the user to interact with the playback device 120, and can include substantially any relevant user interface. For example, the user interface can include one or more of, but not limited to, control buttons, a wireless remote control, touch screen, a stylus pen, a keyboard, a mouse, a joy stick, and/or the like. These and other input devices are often connected to the controller 124 through interfaces that couple to the bus 138, but can be connected by other interfaces, such as a parallel port, an IEEE 1394 serial port, a game port, a USB port, an IR interface, or other such ports. The medium drive 130 receives a portable storage medium 122 and allows the controller or other relevant components of the playback device 120 to directly access content stored on the medium. In some instances, as described above, the medium 122 can store code, software and the like to be implemented by the playback device 120.

The customization engine 132 allows a user to customize how the content from the portable storage medium 122 is displayed, and in some instances how content received from local memory 126 and/or over the network 142 is displayed. In part the customization engine 132 maintains associations between display and/or playback parameters and definitions for relevant display and/or playback parameters. Further, the customization engine provides a user with access to at least a listing of the customizable display parameters and allows the user to designate or select definitions or associated options for the display parameters that can be later utilized in displaying at least the content from the portable storage medium 122. The customization engine 132 can be implemented through hardware, software or a combination of hardware and software. Further in some embodiments, the customization engine is implemented through software in the portable storage medium 122.

The audio output 134 receives audio signals, for example, from the controller 124 or an audio decoder, and outputs audio content to be heard by a user. In some instances, the audio output drives speakers or cooperates with one or more other devices, such as an amplifier, to generate audio signals. The display 136 displays content from the medium 122, content stored in the controller 124 or memory 126, content received from over the network, other such sources or combinations of the sources. The display can be implemented through a computer display, television display, a display of a portable device and/or other such displays. In some embodiments, the playback device 120 is a computer, a digital versatile disc (DVD) player, gaming device, portable player device, or other such playback devices.

Figure 2:
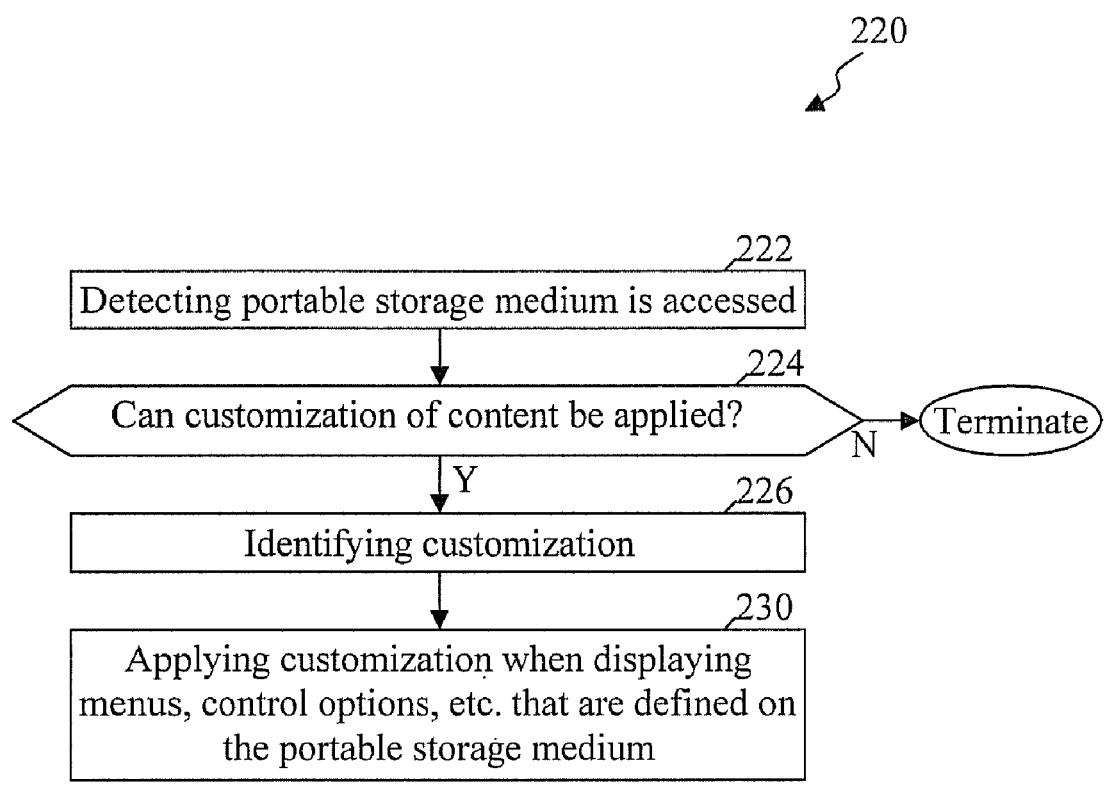
FIG. 2 depicts a simplified block diagram of an exemplary process of implementing customization in displaying content stored on a portable storage medium.

FIG. 2 depicts a simplified block diagram of an exemplary process 220 of implementing customization. Typically, the process 220 is implemented through a playback device 120 playing back and/or displaying content from a medium 122 and/or associated with the medium 122. Initially, in step 222 a medium is detected containing content to be played back. For example, the player can detect that a medium is inserted into the player, selected by a user to be played back (e.g., a play button is selected, a selection of one medium in an instances where the player can hold more than one medium at a time), or other such selections. In step 224 it is determined whether customization can be applied to the content or parameters. In some instances, this determination is based on an identifier on the medium indicating that the customization can be applied relative to the medium (e.g., a mark, metadata, a customization file or directory, and/or customization code or object can be stored on the medium or other such indications or combinations of indications), an identification of a type of medium (e.g., an HD-DVD disc, Blu-ray disc, or other such types of medium), parameters defined locally on the playback device 120, parameters specified at a remote source 150-154, and other such indications that customization can be applied. When it is determined in step 224 that customization cannot be applied the process 220 terminates and playback resumes through standard playback applying parameters as dictated by the medium. This allows the playback device 120 to playback legacy medium and medium not configured for use with customization as well as medium that are configured for customized playback.

In those instances where it is determined in step 224 that customization can be applied, the process 220 continues to step 226 where the available customization and the defined customization parameters are identified in implementing the customization. As introduced above, the customization can be associated with many factors of the content, the displaying of the content, which menu(s) if any are to be displayed, the appearance of menus, the conditions for playback, distributing or publishing content and/or display parameters or definitions to other users, communicating with other users, receiving published content and/or communications from other users, and other such customization. Once the customization is identified step 230 is entered where the customization is applied while the content from the medium is played back and/or other content cooperated with the content of the medium is played back.

The customization provided through the process 220 allows a user to customize the playback of content in a more desirable manner according to the user (or party) defining the customization. Further, the customization allows the user to control aspects of how content is presented or whether content is presented. Additionally, the customization allows a user to customize the playback, display, representation, organization and/or enhancement of content from the portable storage medium 122 and/or content to be played back or displayed relative to the portable storage medium. As examples, the customization can dictate how content is to be played back (e.g., playback including trailers and/or previews, one or more main content items and credits; playback of just the one or more main content items; playback of trailers or previews and the one or more main content items; whether additional content from a remote source is incorporated with the content from the medium; or other such playback); whether and how content and/or display parameters or definitions can be distributed or published to other users; how remote control options or buttons are to be interpreted with respect to one or more content items; how menus are to be displayed; options available through menus; and/or other such customization.

Furthermore, the customization provides for dynamic playback of content. Prior DVD mediums, for example, were static and once content was burned to the medium was fixed and the same every time the content is played back. The customization provided through the present embodiments, however, allows parameters, options and conditions to be adjusted, changes, removed and added after the content is burned to the medium. Similarly, multiple menus can be incorporated onto the medium from which the user can select or the playback device can select (e.g., based on a predefined rotation, randomly or parameters defined by the user). Additionally, a user can establish a consistency, such as a consistent look and feel, across multiple different mediums and/or playback devices by utilizing consistent parameters and definitions for the parameters for the different mediums or playback devices.

Figure 4:
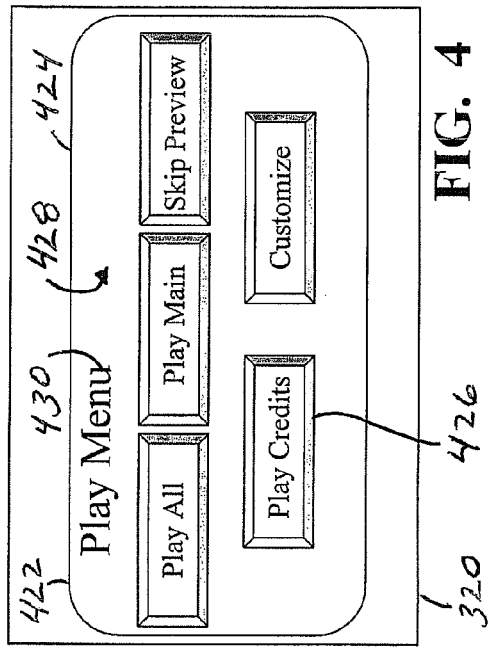
FIG. 4 shows another example of a menu displayed based on different customizations than those applied when the menu of FIG. 3 is displayed.
Figure 3:
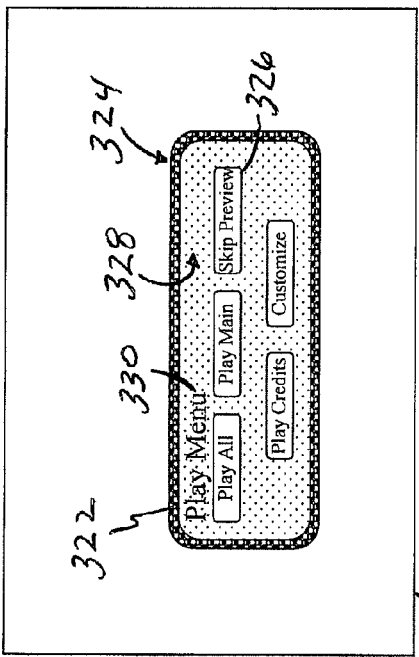
FIG. 3 shows an example of a menu that has a first size and is orientated or positioned on a display in a first position.
Figure 5:
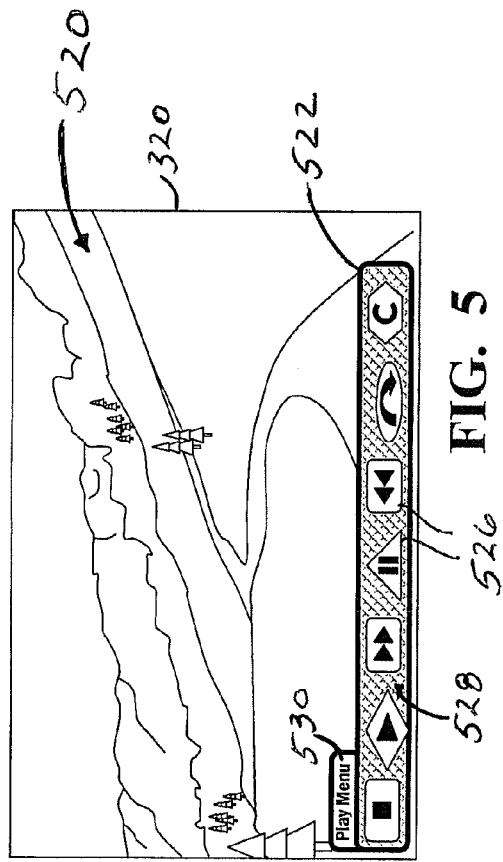
FIG. 5 shows a menu overlaid over a portion of a multimedia content as the multimedia content is being played back from a portable storage medium.

FIGS. 3-5 show simplified exemplary representations of displays 320 that are displaying menus 322, 422 and 522, respectively, according to different applied customizations. As is fully described below, numerous display parameters can be selected and/or defined by a user through a customization. Some of these display parameters specifically allow a user to customize how menus are displayed. The example menu 322 of FIG. 3 has a first size and is orientated or positioned on the display 320 in a first position. Further, the menu has a first border or frame 324, which could have a first color, pattern or the like. A first graphics background or skin 328 is included, which can be a selected color, a pattern, image, picture or other relevant graphics. Additionally, the menu 322 is shown with five options or buttons 326 that have a first shape and size, that are arranged in a first arrangement, and labeling displayed using a first font and a first font size (e.g., "Play All," "Play Main," "Skip Preview," "Play Credits" and "Customize"). The menu 322 further includes a label 330 (e.g., "Play Menu") that is presented with the first font but with a second font size.

The menu 422 of FIG. 4 shows a second example of a menu similar (in terms of the functions depicted, for example) to that of the menu 322 in FIG. 3. However, the menu of FIG. 4 has different customization than the menu of FIG. 3. For example, the menu 422 of FIG. 4 is configured with larger features, with larger buttons and fonts, for example, to allow a user to more readily see and distinguish the options, and is larger overall, i.e., occupies more "area" on the display 320. The menu 422 of FIG. 4 is positioned in a second orientation or location in the display 320, and has a second border 424, i.e., the second border 424 is different from the border 324 of FIG. 3. A second background 428 is shown, for example solid white to enhance the contrast with the buttons and/or text. The second background is different from the background or skin 328 of FIG. 3. Five buttons 426 are shown in FIG. 4 with each button having a second shape and size, as compared to a first shape and size, as depicted in FIG. 3, and the buttons 426 have labels of a second font (typeface) with a third font size, as compared to the first font (typeface), and the first font size, as depicted in FIG. 3 in the labels of the buttons 326 of FIG. 3. A label 430 similar to the label 330 of FIG. 3 is also shown using the second font and a fourth font size.

FIG. 5 shows a portion of a multimedia content 520 being played back from the medium 122 with the menu 522 overlaid on the content. In some embodiments, the customization can configure the menu 522 such that the multimedia content 520 continues to playback as the menu 522 is displayed, while other configurations can cause the playback of the multimedia content 520 to be paused while the menu 522 is displayed over the multimedia content 520. The menu 522 is customized further, according to the example of FIG. 5, to be displayed in a third orientation (e.g., near or at a bottom of the display 320, which can be designated by, e.g., specifying X and Y coordinates, a drag and drop option through a user interface such as using a mouse to select the menu 522 and position the menu at the desired location, selecting one location from a set of predefined locations that are listed as options during customization, or other such designations). The menu 522 is further configured with a third size which is different than the sizes of the first and second menus 322, 422 of FIGS. 3 and 4, respectively, and is elongated such that the options or buttons 526 are displayed in a single row, as contrasted with two rows as is depicted in FIGS. 3 and 4. Further, the menu 522 has a third border 524, for example, that has a color, pattern or the like that is selected from a listing of colors and/or patterns during customization, selected randomly or sequentially (as described below) from potential borders, a graphics file can be designated by a user during customization or other such designation or selection. A third background 528 is also utilized, which again can be a selected or designated color, a pattern, image, picture or other relevant graphics. Additionally, the menu 522 is depicted with a different number of buttons, e.g., seven buttons 526 that have different shapes and sizes, that are arranged in a third arrangement, and labeled (instead of with text, as shown in FIGS. 3 and 4) with images or graphics that represent functions (e.g., stop, play, fast-forward, pause, rewind, skip and customize). The customization of the menu 522 extends to the additional customization of the functionality of the buttons 526 such that some of the buttons provide functionality that is different than the buttons 326 and 426 of the menus 322 and 422 of FIGS. 3 and 4. The menu 522 further includes a label 530 (e.g., "Play Menu") that is presented with a third font and a fifth font size.

Figure 6:
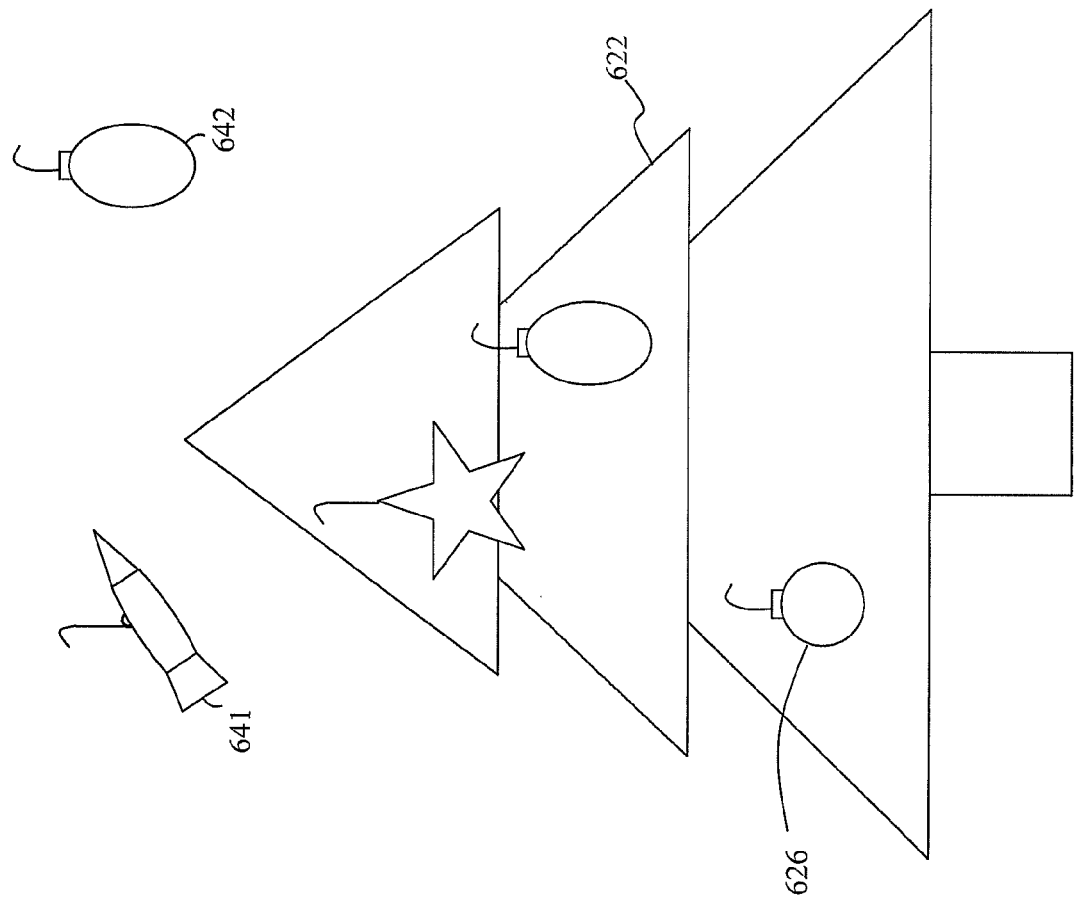
FIG. 6 shows an example of a menu that is customized to have a shape of a Christmas tree, which might be associated, for example, with a Christmas movie stored on a portable storage medium.

FIG. 6 shows an example of a menu 622 that is customized to have a shape of a Christmas tree, which might be associated, for example, with a Christmas movie stored on the medium 122. In some instances, this menu 622 can be generated by the user or provided by the content owner or other third party. The menu 622 is customized further through the placement of selectable buttons or options 626 incorporated into the menu 622 and are in the shape, in this example, of ornaments. In some embodiments, the positioning of the buttons is implemented by a user dragging and dropping an ornament button 640-643 to a desired location within the tree menu (e.g., using a user interface pointing device, remote control or other such user interface), X and Y coordinates can be specified, one or more predefined locations can be selected, or through other such methods. The functionality of the "ornament" buttons 626 may be predefined (e.g., a button can be displayed for each functionality that can be incorporated into the menu, or an "ornament" button can be selected to correspond with a specific functionality), or a user may specify the functionality as they are incorporated into the "tree" menu 622, for example, when a user incorporates a button on the menu 622 a listing of potential functionalities can be displayed allowing a user to select a functionality to be associated with the placed button.

As described above and further below, the customization can allow a user to customize many different aspects of how the content is displayed, what content is displayed, where content is displayed, what is included within the content and/or other such customization. More specifically with menus for example, the functions available through menus can in some instances be customized or partially customized (e.g., some menus may require certain functions while other functions can be added or removed). Additionally, the appearance of the menu, its location on the display and other graphics associated with the menu can in some instances be customized. Still further, the customization in some embodiments can specify what options, controls, content and/or information is included in a menu or other user interface. Customization can be included to identify in one or more user interfaces or displayed menus information about communications received from other users, communications transmitted, a number of pending communications to received or recently received, and other such indications. Additionally, in some implementations users can add or override protections to some content on the medium and/or content accessed to be played back in relation to the medium. For example, a content owner or a parent can add password protection to some or all of the content on a medium and/or content that may be played back in relation to the medium, or even whether additional content may be played back with the medium (e.g., users have the ability to apply password protections on video piece or menus). User profile information and other relevant information can also be used to provide customization. For example, customization can be applied based on special occasions like holidays, birthdays, and anniversaries that can be used to trigger the customization (e.g., skin of a menu displayed), customization can be based on the date the disc was loaded, differences between a date loaded and a previous date loaded, and other such triggers for customization.

As a further example, the playback device 120 and/or applications defined on the medium 122 or received from a secondary source can allow media communications between users, and a communication repository or in-box can maintain these communications or references defining access to these communications (e.g., when the communications are actually stored remotely). The customization can allow a user to define that a notification (e.g., an icon or symbol can be displayed) of a new communication should be provided, a number of pending or un-accessed communications can be listed (e.g., customization can define that each menu displayed further identify the number of pending communications), identify which other users with which a current user typically communications (e.g., friends list) are currently logged-in, and other such customization can be defined.

FIGS. 3-6 show some examples of some of the customizable display parameters and/or characteristics that can be customized relative to displaying menus. Some menus may limit or restrict which parameters can be customized or adjusted and/or restrictions may apply to a menu. For example, some menus may require that the number of buttons be fixed and/or the functions associated with the buttons in the menu be fixed. Other restrictions may prevent some content, such as some background graphics, from being used with a menu, or other such restrictions. Still further, the customization is not limited to menus, but instead can, in some embodiments, be applied to other aspects of the content and/or the playback of the content. For example, some customization can apply to how content is played back (e.g., skip trailers, skip the credits, incorporate edited scenes, incorporate commentary, and the like), language selection of sub-titles, sharing or publishing content to other users, and other such customization.

Figure 7:
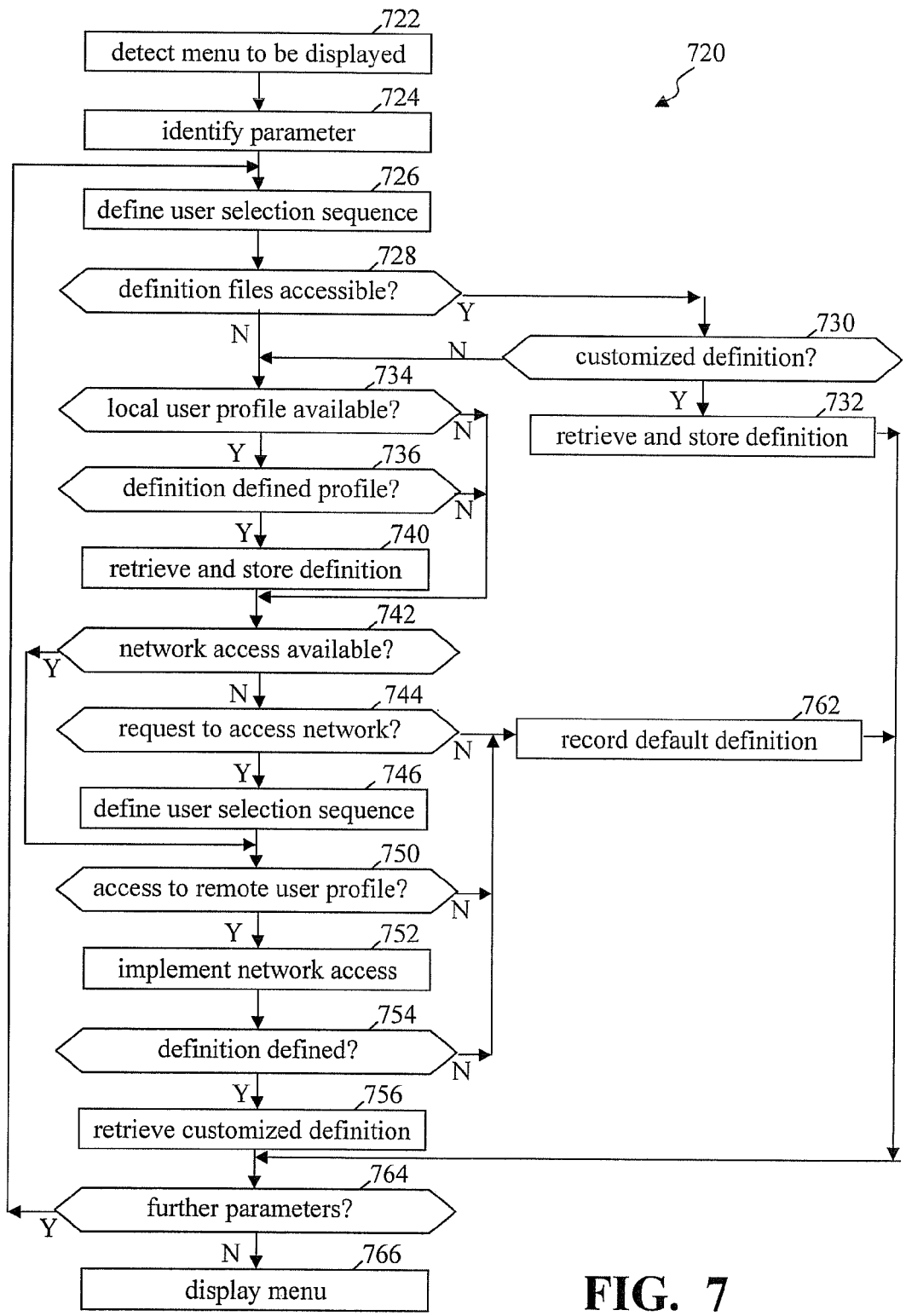
FIG. 7 depicts a simplified flow diagram of a process for use in implementing the application of customization relative to the implementation of the process of FIG. 2 according to some embodiments.

FIG. 7 depicts a simplified flow diagram of a process 720 for use in implementing the application of customization of step 230 of FIG. 2 according to some embodiments, for example, when displaying content to which one or more display parameters are to apply, such as a menu containing options that are selectable by a user. In step 722 the process detects that a menu from the medium 122 is to be displayed. In step 724 a customizable display parameter or parameter variable, specified on the medium relative to the menu, is identified. The parameter can, for example, be a customizable parameter such as a graphical skin or font applied when the content (e.g., the menu) is displayed, how the content is displayed, whether the content is displayed, where content is retrieved, what content might be displayed with and/or in place of other content, what is included and/or associated with the content and other such customization. In step 726, a default definition or setting of the parameter is identified on the medium for the parameter. In some implementations one or more customizable parameters are defined relative to a default setting in those instances where customization is not defined or not being applied and/or when parameters are reset to a default or primary state.

In step 728, it is determined whether one or more definition files, listings or databases are accessible and whether that definition file includes customized definitions. As fully described below, some embodiments store customization of display parameters in one or more files, which in some instances, can be implemented through an Extensible Markup Language (XML) file, a simple text file or other relevant file formats. When a definition file is accessible, step 730 is entered to determine whether the definition file includes a customized definition for the parameter. When a customized definition is defined the process 720 continues to step 732 where the customized definition is retrieved and stored for use in displaying the menu. In some implementations, a link file can be generated associating the parameter with the customized definition in the link file, a temporary menu file can be generated associating the customizable display parameter to the customization definition, or other such recording. As introduced above and further described below, the customization may be defined specific to a portion of the content or a specific content on the medium 122, may be more generally applied to content owned by a certain owner (e.g., customization for content associated with any number of portable storage mediums having content recorded thereon from a certain movie studio or production company), may be applied to certain types of content, may be applied globally relative to all customizations associated with a specific user, or other such applications of the customized definition. For example, a customization can be specified in the user profile as being specific to a certain content, a portion of a certain medium, a specific medium and the like. In some embodiments, the customization can prevent or restrict the use and/or playback of content, for example with other non-authorized content, protections to content (e.g., payment and/or password) and other such restrictive customization. Following step 732 the process skips to step 764.

In those instances where it is determined in step 728 that a definition file does not exist or is not accessible the process continues to step 734 where it is determined whether a local user profile associated with the current user is available. A local user profile is stored in memory 126 of the playback device 120 and can contain parameters, settings, conditions, preferences and the like associated with a specific user, or group of users (e.g., a user profile can be associated with a family, while other user profiles may exist for one or more of the members of the family). When a local user profile exits for the current user step 736 is entered where the profile is evaluated to determine whether a customized definition is defined in the local user profile for the display parameter. When a customized definition is defined in the local user profile for the parameter, step 740 is entered where the customized definition is retrieved and stored for use in displaying the menu. The process then continues to step 764.

When it is determined in step 734 that a local user profile is not available or when it is determined in step 736 that the local user profile does not contain a customized definition for the parameter, the process shifts to step 742 to determine whether access to a network (e.g., the network 142) is available. Some embodiments make this determination by evaluating the abilities of the playback device. For example, a determination of whether the playback device is operating under the Blu-ray 1.1 Standard, or the Blu-ray 2.0 or higher Standard can be used to determine whether a network connection may be available. In those instances where network access is not available a request can optionally be displayed in optional step 744 asking the user whether network access can be established. Step 744 can be skipped in some instances, for example where it can be determined that a playback device cannot connect with the network (e.g., the playback device is operating under the Blu-ray 1.1 Standard). When network access cannot be established the process 720 continues to step 762 where the default definition defined on the medium for the parameter is stored for use in displaying the menu (which may include selecting one of multiple default definitions as fully described below).

Alternatively, when a network connection can be established the playback device 120 is connected with the network 142 through the network interface 140 in step 746. In step 750, it is determined whether to access a remote or networked user profile associated with the current user or to access one or more other sources for definitions of the parameter. Similar to the local user profile, the remote user profile defines user preferences relative to parameters, settings, conditions, preferences and the like. This remote profile is maintained on a network accessible device (e.g., database 151) that can be accessed from multiple devices through the network 142. Typically, protections are applied to the remote user profiles to restrict access to authorized users and/or devices (e.g., password protections, encryption, device authentication, playback device and/or medium identification, and other such protections or combinations of protections). Further in some embodiments, the remote user profile can be used to update or replace a local user profile, and in some instances can be copied to the playback device 120 in place of a lost, deleted or otherwise inaccessible local user profile and/or to generate an initial local user profile. In some instances, a customized definition or other customization stored locally on the playback device 120 (e.g., in a local user profile) can be identified as not having been utilized for a set period of time, and as a result can be deleted from the local storage (e.g., to free up limited local storage). The deleted customization can be maintained, in some instances, through a network storage (e.g., in a remote user profile), which could allow for later retrieval.

Providing access to a remote user profile allows a user to utilize user preferences and/or settings when utilizing playback devices that do not contain a local user profile and/or devices that do not contain the specific user's local profile (e.g., when a user is away from home). Similarly in some embodiments, other sources can provide customized definitions for parameters. For example, content owners, movie studios, record labels, content distributors, and other entities may provide some customized definitions that can be utilized by users, or in some instances, are preferably utilized when network access is available. Because this customization is defined over the network and is not restricted to being fixed on the medium prior to distribution, the customized definition can be varied over time to compensate for changing events and conditions providing a dynamic playback experience. As an example, a movie studio may have released a sequel to a movie and as such may wish to define one or more parameters to associate an earlier movie with the sequel. Many other applications are applicable for this customization over the network as is further described below and will be apparent based on the description provided herein. Additionally, the customized definitions can be based on the user profile, one or more remote user profiles, additional information provided by a user, the content being accessed, geographic location information associated with a user (e.g., IP address, region codes defined on a portable storage medium and/or a playback device, user registration that might include information such home address or country, and other such geolocation information), and other such factors.

The determination of whether to access the remote user profile or other customized definitions in step 750 can be based on an inquiry to the user, defined by the medium (e.g., code instructing access to a link, URL, the utilization of search terms or the like may be defined on the medium), defined on the playback device or other indications that the network is to be accessed. In many instances, the playback device 120 does not know or have programming to implement access to identify customization parameters, and instead this functionality is provided by code, scripts and/or programming on the portable storage medium 122 and implemented by the playback device 120. For example, a disc when formatted according to the Blu-ray specification may include one or more Blu-ray Disc applications and/or objects (such as Java applications) that can be referenced through an associated title specified in an index table to be accessed and implemented by an appropriately configured playback device. These one or more applications, in some embodiments, can provide the playback device with the functionality to implement the customization.

Still referring to FIG. 7, when access is not to be implemented the process 720 shifts to step 762. Alternatively, step 752 is entered where network access is implemented in an attempt to determine whether a customized definition has been defined for the parameter. As introduced above, one or more remote servers 150, databases 151-153 or other sources 154 can be accessed. The remote source can be specified or otherwise identified on the medium 122, user specified, be based on a search of the network (e.g., a medium identification, key words, parameters and the like can be used defined on the medium and/or extracted and utilized in a network search tool), defined on the playback device 120 or other such identifications.

In step 754 it is determined whether a customized definition is defined in the remote user profile and/or other source. When a customized definition cannot be identified the process 720 continues to step 762. Alternatively, step 756 is entered where the customized definition is retrieved and stored for use in displaying the menu. Similar to the locally defined customization, the remotely defined customization may be defined specific to a portion of the content or a specific content on the medium 122, may be more generally applied to content owned by a certain owner (e.g., customization for content from a certain movie studio or production company), may be applied to certain types of content, may be applied globally relative to all customizations associated with a specific user, or other such applications of the customized definition.

The process 720 then continues to step 764 to determine whether further parameters are to be evaluated relative to customized definitions. When further display parameters are to be evaluated the process returns to step 724 to identify a further display parameter. Alternatively, the process 720 displays the menu in step 766 applying the stored default and/or customized definitions for the customizable display parameters accordingly. In some embodiments, accessing the network (e.g., steps 742-356) is postponed until multiple or all of the potential display parameters are identified so that definitions can be retrieved through a single or limited number of accesses to the network. Further, the process 720 is described such that the local user profile customized definitions have a priority over network defined customized definitions. In some embodiments, however, the local user profile is searched after it is determined that a customized definition is not available through the network (e.g., using one or more remote user profiles, databases or other network sources) providing network defined customization definitions priority over the local user profile. The order of priority regarding the local profile customized definitions and network accessed customized definitions in the process 720 can, in some instances, be defined by the medium, player device, user or the like.

As described above, the customized definitions for parameters can be defined locally and/or remotely. Further, because the definition for the parameter is retrieved a consistent definition or definitions can be applied across multiple different mediums. For example, parameter definitions can be defined locally or remotely for a content owner (e.g., a movie studio) so that a look and feel in displaying at least some of the content recorded on a plurality of different mediums can be consistent (e.g., including a symbol or trademark of the movie studio, displaying certain menus in certain color schemes, displaying certain portions of content from the medium and/or additional content retrieved from a separate source in a certain order, and other such implementations to provide some consistency). Furthermore, because customization can be implemented with parameter definitions retrieved from a local user profile and/or remote sources 150-154 over the network 142, these parameter definitions can be applied to multiple different mediums and/or contents, and in some instances to content from different content owners (e.g., different movie studios). Similarly, because users can define customization (whether stored locally, such as a local user profile, or remotely, such as a remote user profile), these user defined customizations can also be applied across multiple different contents and mediums.

Figure 8:
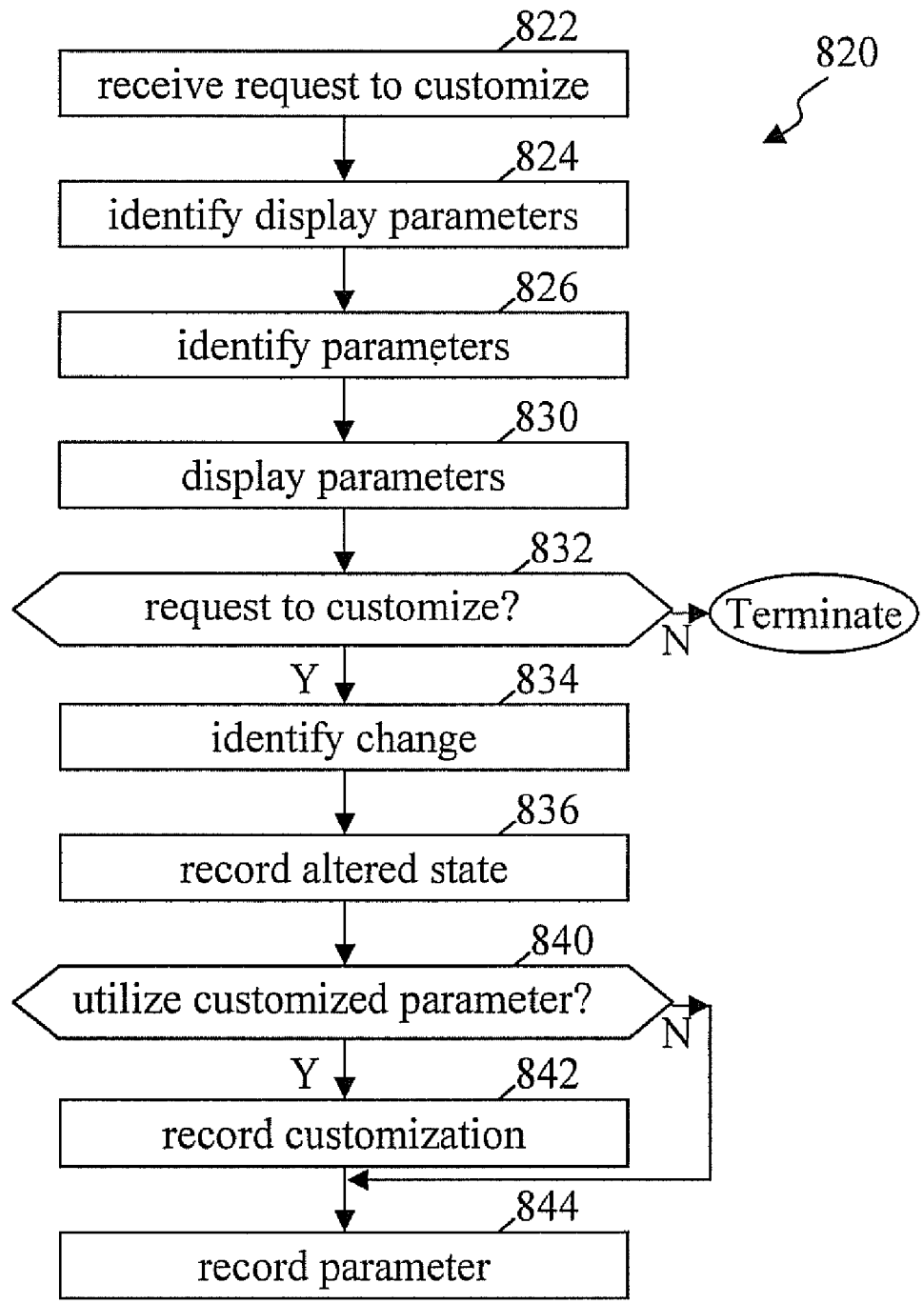
FIG. 8 depicts a simplified flow diagram of an example of a process according to some embodiments in implementing customization when displaying content.

FIG. 8 depicts a simplified flow diagram of an example of a process 820 according to some embodiments in implementing the customization when displaying content. In step 822, a request or command is received to customize display parameters. For example, a customize button is selected on a displayed menu. In step 824, a plurality of available display parameters and their available options are identified. In step 826, one or more customizable parameters of the plurality of available display parameter are identified. The process then continues to step 830 where one or more of the identified customizable parameters are displayed. In some embodiments, the options available for defining the customization of the parameter are also displayed such that the user can select a definition from the options. Additionally or alternatively, a field may be provide that allow a user to enter a designation (e.g., specifying coordinates, a file that contains graphics content, or other such designations) or search for a desired definition (e.g., over the network), or other such methods to allow a user to define or specify the customization and/or altered state of the identified parameter.

In step 832, it is determined whether a request, selection or command is received to customize a first customizable parameter. For example, a selection of an option may be detected. In those instances where a request is not received the process terminates. Alternatively, when a request is detected to alter or customize a parameter from a current setting or state to a different state step 834 is entered where the selected change is identified. The identification can be based on a selection of a displayed option, a designation by the user, or other such identification.

In step 836 the customized or altered state of the parameter is stored. In step 840 it is determined whether the identified display parameter and/or the selected or defined customization is to be utilized instead of a default display parameter or previously defined display parameter, or is to be used instead of a default setting of the identified display parameter, such as a setting as defined on the portable storage medium 122. In those instances where the customization is to be used in place of a default or previously defined parameter the process continues to step 842 where the customization is stored or recorded, for example, in a definition file writing over the previous definition. In those instances where there is no previously defined parameter step 844 is entered and the parameter and/or specified option are stored. The customization can then be accessed upon displaying content in accordance with the defined customization.

In displaying content, in some instances, the definition file is accessed by the application displaying the relevant content to receive the definitions for customizable parameter defined. Additionally or alternatively, a virtual package defined in accordance with the Blu-ray Specification through a virtual file system (VFS) can be generated or updated with some or all of the defined customization such that upon playback and/or displaying of the content the customization defined is implemented. For example, if customization is defined that dictates that revised content is to be played back in place of a portion of content recorded on the medium, an updated virtual package can be generated designated access to the revised content instead of pointing to the portion of content to be replaced. Similarly, an index file and/or playlist can be updated or altered, in some embodiments, to implement the customization. In updated a playlist, for example, one or more titles and corresponding clip information can added, replaced, deleted or otherwise updated. Further, applications can be added, replaced or substituted to implement the customization. For example, a Blu-ray Disc Java object and/or application can be altered to access additional and/or different Java program files (JAR) (e.g., an application management table can be updated or altered).

As described above, there may be some instances where more than one definition is available for a given parameter or parameter variable. For example, the medium may define multiple default definitions for a given display parameter. Similarly, a user profile or remote source may specify more than one customized definition for a parameter. The selection of one or more of the multiple definitions to be used during displaying of content may be based on a user selection. In some instances, however, the selection may be based on a sequential order, a random selection or other such selections.

Figure 9:
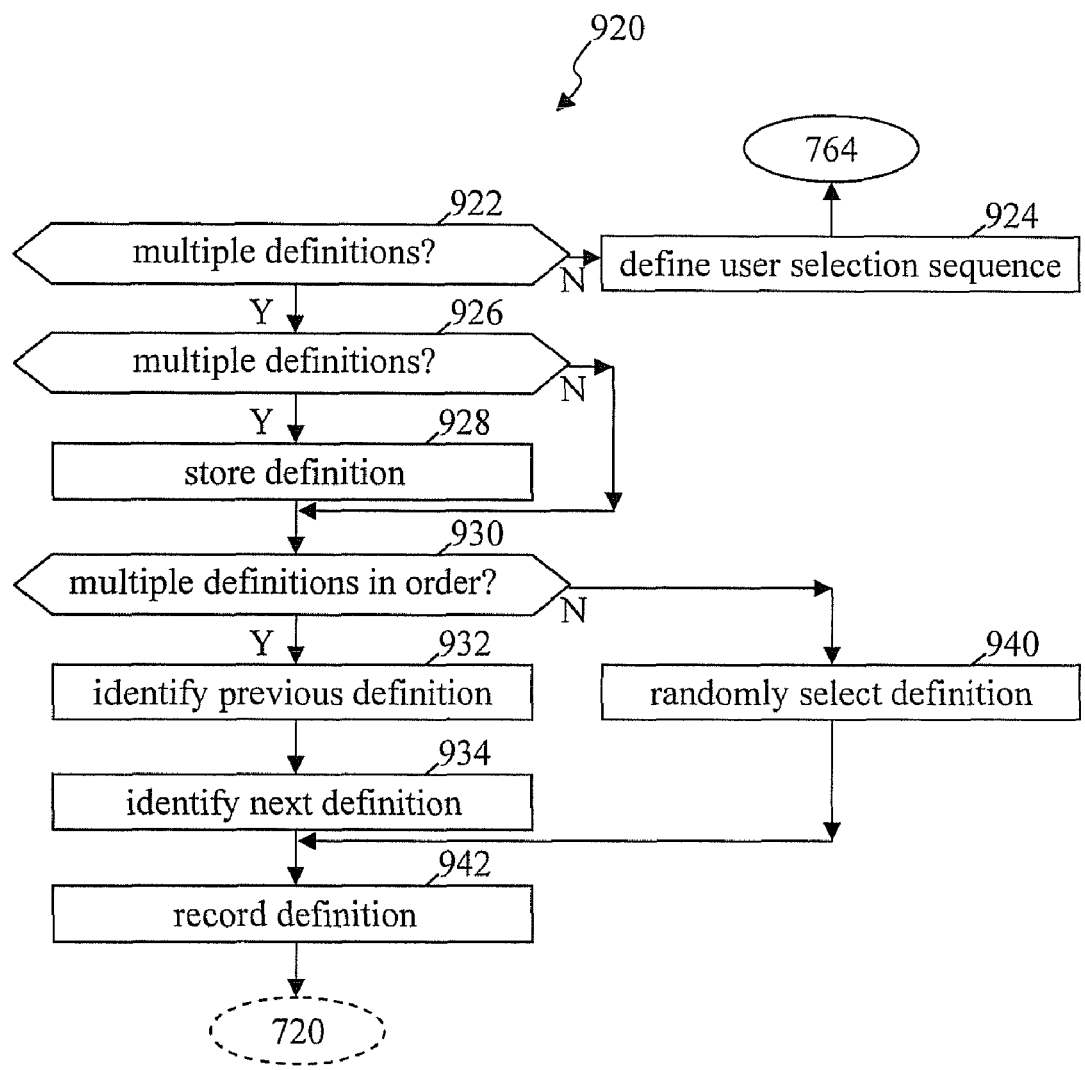
FIG. 9 depicts a simplified flow diagram of a process in selecting one of a plurality of definitions for a parameter in applying customization according to some embodiments.

FIG. 9 depicts a simplified flow diagram of a process 920 in selecting one of a plurality of definitions for a parameter according to some embodiments. For example, the process 920 may be applied as part of one or more of steps 732, 740, 756 and 762 in storing the customized definition in the process 720 of FIG. 7. In step 922, a determination is made whether more than one parameter definition is specified for a given parameter. In those instances where it is determined that only a single definition is specified the parameter definition is stored (e.g., in the definition file) in step 924, and in some instances the process 920 returns to step 764 of the process 720 of FIG. 7 to determine whether further parameters are to be evaluated. Some embodiments, however, allow multiple parameter variable definitions to be defined for a given parameter variable. These parameter definitions may be retrieved from the medium, the local and/or remote user profile(s), remote networked source or the like. For example, the medium may define ten different definitions for a given parameter. Other parameters may have a single definition or similarly have multiple definitions.

When it is determined in step 922 that multiple definitions are defined the process continues to step 926 to determine whether one of the definitions has been defined as the definition to be utilized, for example, determine whether a user has selected or defined the use of one of the definitions. When a definition is select, step 928 is entered and the definition for the parameter is stored, for example, in the definition file. Alternatively when one of the parameter variable definitions is not selected, the process 920 continues to step 930 to determine whether the multiple definitions are to be utilized in a predefined order, such as sequentially or a round-robin order. The predefined order can be specified by the medium, selected by the user, defined by the user profile (local or remote) or other relevant sources. In those instances where the multiple definitions are to be utilized according to a predefined order step 932 is entered where a previously utilized definition of the multiple definitions is identified, and in step 934 a next definition of the multiple definitions is identified according to the predefined order.

When it is determined in step 930 that a predefined order is not specified the process 920 continues to step 940 where a subsequent definition of the multiple definitions is randomly selected. Following steps 934 and 940, step 942 is entered where the identified definition of the multiple definitions is stored, for example, in the definition file. The process then, in some embodiments, returns to process 720 (e.g., to one of steps 732, 740, 756 or 762).

As described above, some embodiments employ one or more definition files, listings or databases that are utilized when displaying content and menus associated with and/or recorded on the recording medium. The playback device 120 is capable of storing parameter definitions to one or more definition files, and in some instances overwriting previously recorded parameter definitions as definitions for parameters are changed (e.g., according to the process 720 of FIG. 7). The parameter definitions can be specific values, numeric codes or the like that can be interpreted by the playback device, for example, with dimensions of a boundary of a menu or dimensions of option buttons displayed within the menu. Additionally or alternatively, parameter definitions stored within the definition file can be a pointer or link to a value, file or other relevant sources for defining the parameters. For example, a definition can be a pointer to a graphics file that is utilized in displaying a background graphic of a menu when displayed, such as a Joint Photographic Experts Group (JPEG) file, Portable Network Graphics (PNG), Graphics Interchange Format (GIF) file or other relevant graphics file. Similarly, a definition can be a pointer, URL or other designation to a remote source to obtain the defined customization in determining what customization to apply.

FIG. 10 depicts a simplified textual representation of an example of a portion of code 1020 recorded on a portable storage medium that is utilized when displaying content, a menu in this example, and a portion of a definition file 1022 accessed by the playback device when implementing the code 1020. In some instances, each content (e.g., menu) to be displayed has one or more associated definition files. In other embodiments, however, a single definition file may be utilized for more than one content, and/or in displaying a single content multiple definition files can be accessed.

As shown in the example of FIG. 10, the menu code 1020 identifies parameters by a call to the definition file (e.g., a call to file "LXGImageRegionsPlot"), where examples of the calls are identified by reference numbers 1030-1032 associated with parameters "SCENES_BACKGROUND," "SETUP_BACKGROUND," and "SPECIALFEATRUES_BACKGROUND," respectively. Upon detection of the calls the definition file is accessed to retrieve the definition for the associated parameter. In the example of FIG. 10 the definitions are identified by reference numbers 1040-1042 that correspond with reference numbers 1030-1032, respectively. The definitions, in some embodiments, can further reference other definition files creating a chain of definition files. The code 1020 and/or the definition file can be implemented using a simple text file, XML, C++, Java or other relevant code and/or file formatting.

In some embodiments, one or more definitions for parameters may be incorporated directly into the code for displaying the content. The definitions in some instances can reference other files. Further in some instances, the code can be adjusted or updated to re-define a parameter, to incorporate addition definitions and/or to remove definitions. Below is a simple example of a markup file, according to some embodiments, that can be employed in displaying two buttons:

Example Markup

```
-->
- <root xml:lang="en" xmlns="http://www.dvdforum.org/2005/ihd"
    xmlns:style="http://www.dvdforum.org/2005/ihd#style"
    xmlns:state="http://www.dvdforum.org/2005/ihd#state">
  - <head>
      <styling />
    - <timing clock="page">
      - <defs>
          <set id="ButtonNormal" style:backgroundFrame="0" />
          <set id="ButtonFocused" style:backgroundFrame="1" />
          <set id="ButtonSelected" style:backgroundFrame="2"
            state:focused="true" />
        </defs>
      - <par>
          <cue use="ButtonFocused"
            select="id('HelloWorldButton1')"
            begin="id('HelloWorldButton1')[state:focused( )=1]"
            end="id('HelloWorldButton1')[state:focused( )=0]" />
          <cue use="ButtonSelected"
            select="id('HelloWorldButton1')"
            begin="id('HelloWorldButton1')[state:actioned( )=1]"
            end="id('HelloWorldButton1')[state:actioned( )=0]" />
          <cue use="ButtonFocused"
            select="id('HelloWorldButton2')"
            begin="id('HelloWorldButton2')[state:focused( )=1]"
            end="id('HelloWorldButton2')[state:focused( )=0]" />
          <cue use="ButtonSelected"
            select="id('HelloWorldButton2')"
            begin="id('HelloWorldButton2')[state:actioned( )=1]"
            end="id('HelloWorldButton2')[state:actioned( )=0]" />
        </par>
      </timing>
    </head>
  - <body>
    - <div style:position="absolute" style:x="100px" style:y="100px"
        style:width="388px" style:height="122px">
        <button id="HelloWorldButton1" style:width="388px"
          style:height="122px" state:focused="true"
          style:backgroundImage="url('helloworld0.png')
          url('helloworld1.png') url('helloworld2.png')" style:opacity="1.0"
        />
      </div>
    - <div style:position="absolute" style:x="588px" style:y="100px"
        style:width="388px" style:height="122px">
        <button id="HelloWorldButton2" style:width="388px"
          style:height="122px"
          style:backgroundImage="url('helloworld0.png')
          url('helloworld1.png') url('helloworld2.png')" style:opacity="1.0"
        />
      </div>
    </body>
  </root>
```

In this example, which in some embodiments is implemented through a markup file (e.g., XML), two buttons are displayed, each with three states: normal, focused and selected. When a button's state changes (for example, the state:focused( )=1) it causes the begin attribute for one of the <cue> elements to become true which activates the cue element. When a cue element is activated, a set of elements are selected according to the XPath value in the "select" attribute (for example, the XPath expression "id ('HelloWorldButton1')" which selects in this example the element with the id="HelloWorldButton1"). To these selected elements, a specific animation command is applied.

In this example the cue elements do so with a "use" attribute to choose a "set" command from the defs element. The set commands change one or more attributes to a new value. The definitions can be altered, additional definitions can be added and definitions can be deleted or disabled as specified during customization. In some instances definitions can be defined that reference other definition files similar to the example described above with reference to FIG. 10.

As introduced above, in some embodiments, the customization is provided through one or more customization codes or applications recorded on the portable storage medium 122 and implemented through the playback device 120. As such, the playback device may not include any code or applications to provide customization or implement the display and/or access to content in accordance with customization, and instead the implementation of customization is provided through the applications retrieved from the medium 122. Also as described above, some embodiments comply with, for example, the Blu-ray Specification and implement one or more of the applications or code to provide customization through one or more Blu-ray Disc Java (BD-J) applications.

In some implementations, customization codes (e.g., a BD-J application) can have access to audio, video and other data on a Blu-ray Disc (BD) (e.g., BD-ROM disc), stored locally on the playback device or accessed over a network 142. A customization application can access, utilize and/or display audio, video and other content. Further, a customization application can have access to local playback device memory 126 and/or external servers/sources 150-154, via the network 142, to retrieve as well as send data, content and/or like (e.g., Java Program file (JAR)) to the memory 126 or external server. Additionally, a customization application, in many instances, can receive inputs from a user via some input device or from a remote source. Still further, customization applications can use one or more application program interfaces (API) to access resources of the playback device 120, including, but not limited to: BDROM file system, BD-ROM media decoders, static content decoders, storage devices and a network connection.

A customization application can link with an object (e.g., BD-J Object). A BD-J Object can contain a table of BD-J applications and indicate one or more JAR files containing and/or accessed by BD-J applications. A customization application can call one or more other applications and/or customization applications, call one or more content titles, cause menus or other content to be displayed, initiate access to remote sources, and other such actions. Further, is some implementations, a customization application may be limited to an index file specified on the portable storage medium 122; however, in some instances, the index file may be updated and/or the index file may be updated as part of a customization application. For example, an updated binding unit manifest file can be retrieved (e.g., from a remote source) and used in generating an updated virtual package from a virtual file system employed by a playback device 120 in allowing a user to access, playback and interact with content from the medium, from local storage (e.g., memory 126, removable memory or the like), and/or from a remote source.

The customization of the playback of the content from the portable storage medium 122 allows, in part, the user to customize how content is displayed, whether content or portions of content on the medium are displayed, whether supplemental content is incorporated with content from the medium, how supplemental content is incorporated with the content from the medium, how menus are displayed, options incorporated within the menu and other such customization.

This in part allows the end user to view a more enjoyable experience upon playback of the content.

Figure 11:
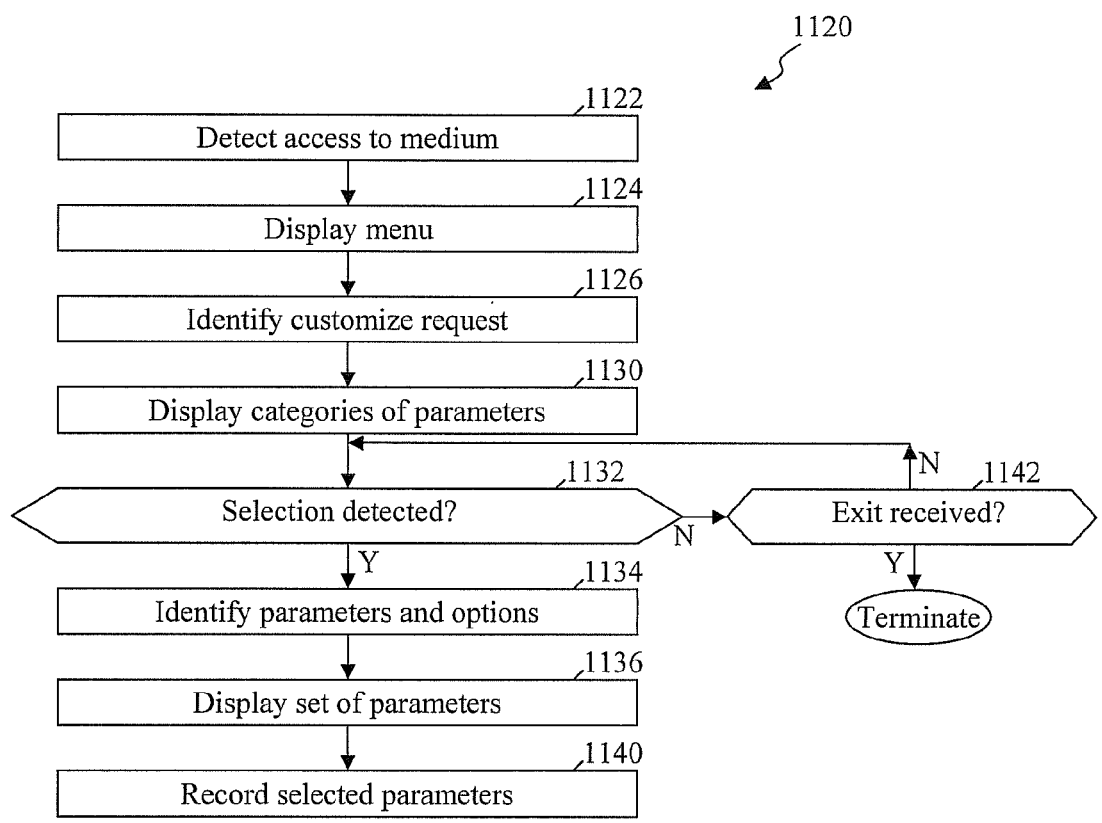
FIG. 11 depicts a simplified flow diagram of an example process according to some embodiments that allows a user to customize how content, such as a menu, from a portable storage medium is to be displayed.

FIG. 11 depicts a simplified flow diagram of an example process 1120 according to some embodiments that allows a user to customize how content, such as a menu, from a portable storage medium 122 is to be displayed. In some instances, portions of the process 1120 can be implemented through one or more customization applications provided on the medium 122 and/or obtained from a remote source, such as server 150. In step 1122, the process detects that a portable storage medium is being accessed. In step 1124, a menu from the portable storage medium is displayed. The displaying of the menu in step 1124 can include applying one or more of the processes 220, 720, 820 and/or 920.

In step 1126, a request to customize the menu is identified. In many embodiments, the displayed menu includes a "customization" option or button that can be selected by the user indicating a request to customize the menu. The detection of the customization option can activate a customization application, such as a BD-J application provided on the medium 122. In step 1130, one or more categorizes of display parameters and/or options that are customizable or customizable relative to the displayed menu are identified and displayed. Typically, the displayed categorizes are displayed within a graphical user interface allowing the users to interactively select one or more of the categorizes, for example, utilizing a keyboard, mouse, other pointing device, or otherwise selecting a category. Further in some embodiments, the listing may simply display one or more customizable parameters instead of displaying categorizes, for example, when the number of available customizable parameters is relatively limited. The categorizes can be defined in the playback device 120, based on an evaluation of the parameters or parameters and/or definitions for display parameters are associated with categorizes as they are stored in a definition file, the categorizes can be defined by the medium, or a remote source can be accessed (e.g., remote server 150) that can provide some or all of the categorization.

In step 1132, a determination is made whether a selection of one or more of the categorizes has been detected. When a selection is detected the process 1120 continues to step 1134 where a set of display parameters and their associated definition options are identified. As an example, a category may include menu appearance and the display parameters for this category may include border color, skinning, background, size and location, and the definition options may include a listing of available colors for the border, a listing of available graphics files that can be applied for the background, while the size and location parameters may have options (e.g., listing of potential sizes and/or locations) or may not have specific options but instead simply include fields that allow a user to define coordinates and/or dimensions relative to the size and/or location (in some instances, graphics coordinates can be defined across multiple different content or medium distributors or a graphics coordinate standard can be utilized to provide consistence when applying customization). The categorizes, parameters and/or options can be substantially any relevant categorizes, parameters and/or options and are not limited to the examples described herein. The parameters can be defined on the portable storage medium, the player device and/or from a remote source (e.g., remote server 150).

In step 1136, the set of display parameters are displayed, for example, in a graphical user interface. In some embodiments, the associated options for some or all of the display parameters may be displayed; pull-down menus may be provided to access the options; additional buttons associated with the selected display parameters may be displayed upon detecting the selection; a further user interface can be displayed with a listing of options associated with the selected button; or other such configurations can be applied. In step 1140 the selected display parameters and the associated selected option or defined characteristics are stored, for example, in one or more definition files. The selected customization may be globally applied (e.g., a defined customization for menus can be globally applied when displaying any menu, assuming another customization of a specific menu does not override the globally defined display parameter), may be applied to a specific menu, may be applied to menus associated with a portion of the content on the portable storage medium, or other such applications. Further in some instances, the user can define the scope or breadth of a definition, e.g., whether a definition for a parameter is global, specific to single menu or some other application. In some embodiments, the process 1120 then returns to step 1130 to again display the categorizes of display parameters and/or options.

Referring back to step 1132, when it is determined that a selection of one of the categorizes is not received the process 1120 continues to step 1142 to determine whether an exit command or option is received or detected. When an exit command is not received the process returns to step 1132 to determine whether the selection is received. Step 1142 allows a user to exit the customization and/or allows the process 1120 in some embodiments to detect that a time period has elapsed and to exit the customization process.

As described above, the user is provided with a list of categories and/or options that can be utilized in customizing the playback of content, such as customizing how menus are displayed, language utilized, whether additional content can or should be incorporated, what content is played back, how content is played back, information about or from other users, and other such customization. The display parameters can be accessed from or defined on the medium 122, the playback device 120, a user profile and/or from a remote source 150-154. In some embodiments, one or more of these sources may further define limitations or restrictions in customization or use of one or more display parameters. For example, a user profile may be associated with a child, and as such, the user profile can restrict the customization of some parameters, such as limiting types of content that can be accessed or incorporated into a menu or with other content. Similarly, a remote source, such as a network server utilized by a movie studio may apply some restrictions, such as limiting the incorporation of content from other movie studios and/or limiting the sources of additional content that might be incorporated or played back with the content from the medium 122. Alternatively, one or more of these sources of display parameters may provide additional parameters that are not identified or available through the other sources. For example, a movie studio may provide additional customization options not defined on the medium, additional graphics or content that is not available through the medium or the playback device and that may be incorporated during playback with the content on the medium and the like.

Figure 12:
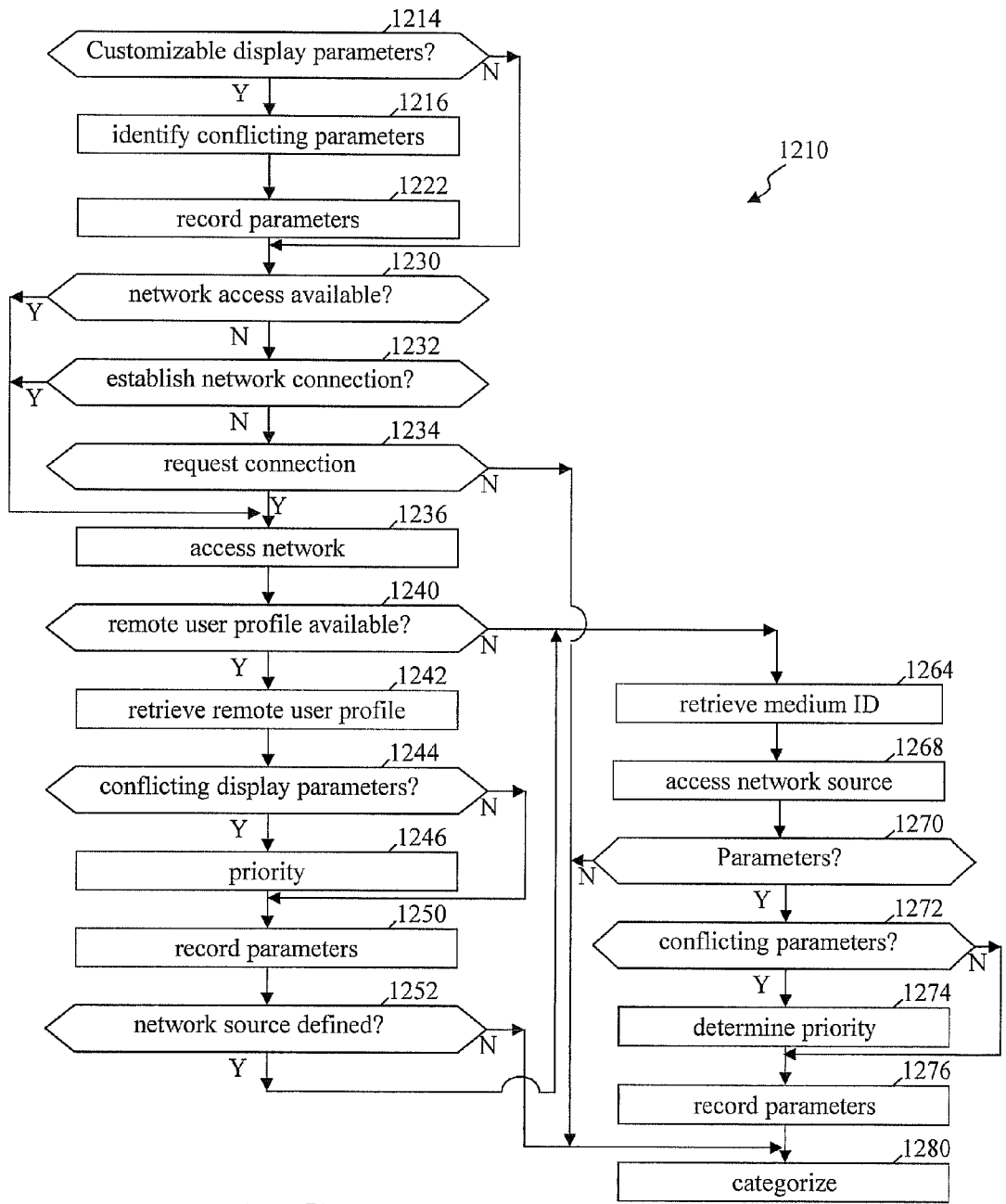
FIG. 12 depicts a simplified flow diagram of a process to identify parameters and/or restrictions in displaying categorizes and/or display parameters options relative to customizing the display of content.

FIG. 12 depicts a simplified flow diagram of a process 1210 to identify parameters and/or restrictions in displaying categorizes and/or display parameters options. The process 1210 may be implemented upon detection of a medium being inserted into the playback device, implemented in response to a request to customize or other such activation. For example, process 1210 may be employed as at least part of the implementation of step 1130 of FIG. 11. In step 1214 it is determined whether the medium identifies or offers the use of customizable display parameters or defines restrictions or limitations on display parameters and/or options of display parameters. In some instances, step 1214 further identifies categorizes when defined that are associated with the display parameters, options or restriction. When the medium does not identify display parameters or restrictions the process 1210 continues to step 1230 as described below.

Alternatively, step 1216 is entered to identify those display parameters and/or restrictions detected from the medium that are already locally stored or defined, such as those stored on the playback device 120 in one or more parameter files or a user profile, that can be utilized by the playback device. In storing the display parameters, the options available for a display parameter, when options are defined, are also identified and stored. For example, when a display parameter is a menu display location parameter, options may include "center," "top-center," "bottom-center," "X-location," "Y-location" or other relevant options. As another example, when a display parameter is a menu border color, the options may include "red," "green," "blue," or substantially any relevant color.

In those instances where one or more identified parameters or restrictions are already stored or defined in a parameter file, the process in some embodiments continues to optional step 1222 to identify those display parameters or restrictions already stored in a parameter file (e.g., based on a prior medium accessed, previously defined by a user profile or other such sources) that conflict, overlap or otherwise may be related with a display parameters or restriction identified on the medium, and the parameter or restriction having priority is identified. Further, for those display parameters and/or restrictions that already have conflicting, overlapping or related parameters defined in a parameter file the process in step 1222 determines whether the already stored parameter or the medium defined parameter (or restrictions) have priority. The priority can be based on many factors, such as the source of the already defined parameter or restriction (e.g., from another medium, from a user profile, from a remote source, or the like), a rating may be applied to the defined parameter, or other such priority.

In step 1224, the display parameters or restrictions identified from the medium that are not already stored or defined within a parameter file are stored in a parameter or definition file, and similarly, those display parameters and restrictions defined by the medium that have priority over previously stored parameters and restrictions are stored in a parameter file, and in some instances overwrites the previously stored parameter and/or restriction.

The process 1210 then continues to step 1230 to determine whether network access is available and active. In those instances where the access is not available step 1232 is entered to determine whether a network connection can be established and/or that the connection can be activated. When it is determined that the network connection cannot be established and activated some embodiments continue to optional step 1234 to issue a request to the user to determine whether the user can establish a connection (e.g., turning on a network interface (e.g., a modem or the like) or connecting the playback device with a network). In those instances where a network connection cannot be established the process 1210 skips to step 1280 to categorize the display parameters and/or restrictions as fully described below.

In those instances where the network access is active, as determined in step 1230, or is activated, as determined in step 1232, the process continues to step 1236 where the network is accessed. In step 1240, it is determined whether a remote user profile is available over the network 142. The source of the remote user profile may be locally stored (e.g., in a local user profile), a default source can be accessed that directs the playback device to the appropriate source for the remote user profile, or other such designations. In those instances where the remote user profile cannot be accessed the process 1210 skips to step 1264. Alternatively, step 1242 is entered where the remote user profile is retrieved or otherwise accessed. This may include, in some embodiments, providing authorization, authentication, password(s) and/or other such security admission to gain access the remote user profile. In step 1244 the remote user profile is evaluated to determine whether the remote user profile identifies display parameters or restrictions that conflict, overlap or are associated with parameters or restrictions that are recorded in the parameter files. When the remote user profile does identify one or more display parameters or restrictions that conflict, overlap or are otherwise associated with already stored parameters and/or restriction step 1246 is entered to identify which of the remote user profile identified parameters or the already stored parameters (or restrictions) have priority. In some embodiments, categorizes listed in the remote user profile and associated with the display parameters and/or restrictions are also identified.

Following step 1246 and in those instances where it is determined in step 1244 that the remote user profile does not include display parameters or restrictions that conflict, overlap or are associated with already stored parameters or restrictions, the process 1210 then continues to step 1250 to locally store in the one or more parameter files the display parameters or restrictions listed in the remote user profile that are not already stored in the parameter files and those that have priority over already stored parameters or restrictions.

In step 1252 it is further determined whether the medium 122 defines a network source (e.g., one or more of sources 150-154) that may provide and/or identify display parameters and/or restrictions. Some mediums may include, for example, Internet links to one or more sources that can further define or provide display parameters or may specify restrictions (these sources may additionally or alternatively provide additional content or provide other services as described above and further below). When the medium does not specify a link to a remote source the process 1210 skips to step 1280. Some embodiments, following step 1252 when it is determined that the medium 122 does not define remote sources, may look to other locally stored content (e.g., user profile, playback device defined, or the like) for links to remote sources. Additionally or alternatively, some embodiments may further employ a search of the network 142 in attempts to local sources. The search can include extracting information from the medium, such as a medium identification (ID), title of content on the medium, key words or search terms (whether predefined or extracted) from the medium, content owner ID and/or other such search parameters.

When a remote source is identified (or otherwise identified) in step 1252 the process continues to step 1264 where a medium ID (or other indications from the medium, such as a content title or other such indicator) is retrieved from the medium 122. Some embodiments further retrieve a user ID, playback device ID, user profile (or part of user profile) or other information, such as information that would notify the remote source that the user should be granted access or provided with the opportunity to gain access (e.g., through the payment of a fee) to the source. In step 1268 the one or more network sources are accessed. Accessing the network source may include authentication, logging-in, making a payment or other such access conditions.

The network source is evaluated in step 1270 to determine whether one or more display parameters or restrictions are provided. In some instances, categorizes associated with the provided display parameters or restrictions are also noted. The parameters or restrictions may be identified based on the medium ID, user ID, user profile, playback device ID and/or other such identifiers. Further, these parameters or restrictions may be generally applicable parameters or restrictions, or may be specific to the medium 122 (or a group of medium). When display parameters or restrictions are identified, step 1272 is entered to determine whether one or more of the network identified display parameters or restrictions conflict, overlap or are associated with display parameters or restrictions already stored in the local parameter file(s). When display parameters or restrictions do not conflict, overlap or are associated with already stored display parameters or restrictions the process skips to step 1276. Alternatively, step 1274 is entered when network source identified display parameters or restrictions conflict, overlap or are associated with display parameters or restrictions already stored in the local parameter file(s) to identify whether the network identified or already stored display parameter (or restriction) has priority.

In step 1276, the one or more display parameters or restrictions provided by the network source that are not already stored in the parameter files and those that have priority over already stored parameters or restrictions are stored to the one or more local parameter files. Following step 1276 and when it is determined in step 1270 that display parameters or restrictions are not identified at the network source, the process 1210, in some embodiments, continues to optional step 1280 where the display parameters and/or restrictions are categorized and the categorization is stored, for example, in the parameter files or else where, such as a category file. The categorization performed in step 1280 can be based at least in part on categorizes identified as being associated with the display parameters and restrictions when the display parameters and restrictions were stored, and/or on an evaluation of parameters preformed by the playback device that attempts to identify those display parameters and/or restrictions that are associated or related. In some embodiments, those display parameters and restrictions that are not associated with or cannot be determined to be associated with other parameters may be defined with their own category or associated with a miscellaneous category.

In some embodiments, some or all of the one or more parameter files can be incorporated into a local user profile, a remote user profile and/or stored at a network source (e.g., database source 151). Incorporating parameters and parameter definitions (and option selections) into a network or remote user profile allows the display parameter and/or restrictions to be accessed from the remote user profile, and in the instance where the display parameters and/or restrictions are network accessible the display parameters and/or restrictions can be utilized by a user on devices remote from a device where the local user profile is stored. This can in part reduce processing time at a remote device by not having to generate the one or more parameter files. Further, in some instances, some or all of the remote user profile can be downloaded and stored locally, for example, in the event that an earlier local user profile is lost or overwritten, and/or a user desires to update a local user profile based on designations in the remote user profile. Similarly, some or all of the local user profile can be up loaded to the remote source (e.g., user profile database 151) as the remote user profile or one of multiple remote user profiles for the user. Additionally or alternatively in some embodiments, some or all of the parameter files can be distributed or published to other users, and/or be used in defining what content may be published and to which users content, parameters or definitions are to be distributed.

The use of parameter files allows the playback system when allowing a user to input and/or define customizations to quickly and accurately provide the user with available customizable parameters while maintaining restrictions relative to the parameters, user, content, playback system, and/or the like. Further, the categorization provides an organization to the display parameters as well as providing the users with a more intuitive access to the display parameters.

Figure 13:
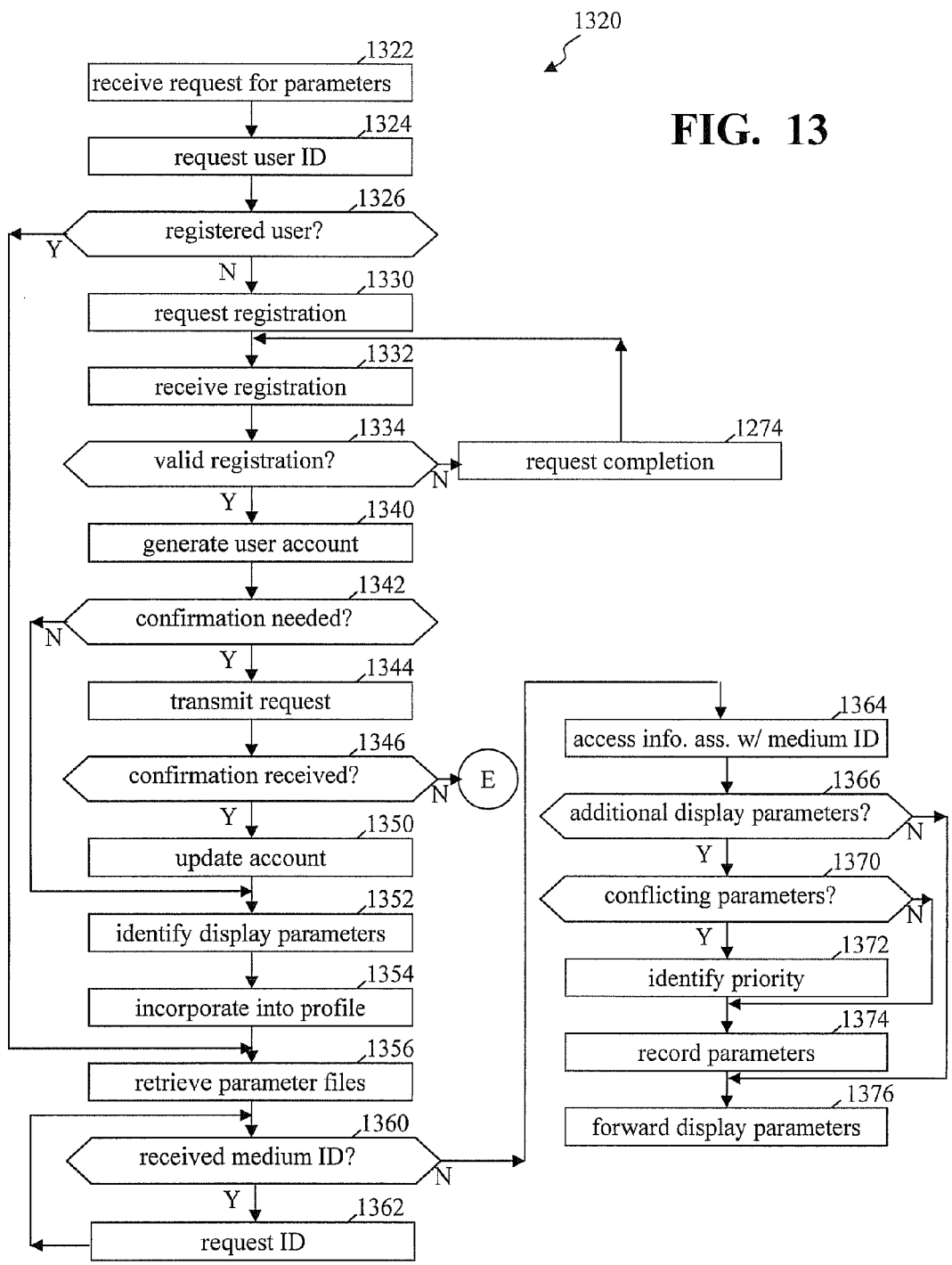
FIG. 13 depicts a simplified flow diagram of a process to enhance customization from a server for one or more playback devices and/or users according to some embodiments.

As described above, the customization in displaying content can, in some embodiments, be enabled and/or enhanced from a remote source, such as a source that operates or utilizes a networked server to receive requests and distribute information and/or commands. FIG. 13 depicts a simplified flow diagram of a process 1320 to enhance customization from a server for one or more playback devices and/or users according to some embodiments. In step 1322, a request is received from a playback device requesting customization parameters, options and/or restrictions. For example, the request may be received following step 1268 of the process 1210 of FIG. 12 as the playback device initiates access with the remote source. In step 1324 a request is returned to the playback device requesting a user identification. This identification can be a log-in, an encryption key, a user name, a password, or other such identifications or combinations of identifications.

In step 1326, it is determined whether the user is registered with the source of content and/or the server. When the requesting user is registered the process 1320 skips to step 1356. Alternatively, step 1330 is entered where a request is returned to the playback device requesting that the user register. This registration, in some implementations, can include returning a web page with a graphical user interface that includes fields that the user is to fill-in, such as "user name," "address," "email address," "phone number," and other relevant fields. Some embodiments additionally request the user designate a level of service. The levels of server may further include different levels of payment, and one or more of the fields can provide the user with the ability to supply a method of payment (e.g., credit card number, Internet payment account, or other such methods).

In step 1332, the user registration is received from the user. In step 1334 the user registration is evaluated to determine and/or verify that mandatory fields have been filled in and/or are valid. In those instances where a field is not filled in or is invalidly filled in, step 1336 is entered and a request is transmitted requesting that the fields be filled in. Typically, those fields that were not filled in or that were inaccurately filled in are identified. Following step 1336 the process 1320 returns to step 1332 to receive the revised registration and perform the validation in step 1334.

In those instances where the user registration is accurately received and completed the process continues to step 1340 where a user account and/or profile is generated. Step 1342 is then entered to determine whether a confirmation of information from the user account and/or profile is needed. This confirmation can be a confirmation of a user's age, a payment type, a password or other such confirmations. In those instances where confirmation is not needed the process skips to step 1352. Alternatively, step 1344 is entered where a request for confirmation of one or more aspects of a user account and/or profile is transmitted to the playback device. In step 1346 it is determined whether an accurate confirmation is received. In those instances where an accurate confirmation is not received an error is generated and in some instances the process terminates. In step 1350 the user account information and/or profile is stored and/or updated.

The process continues to step 1352 where available display parameters and/or restrictions are identified and locations determined, whether accessible directly from the server or as directed by the server to another source (e.g., a database or other server). In identifying the display parameters that are available a user's access to parameters are taken into consideration. For example, when the user is under a defined age (e.g., under 14, a minor, or the like) the server may restrict or prevent access to some potential display parameters that might be available to other users (e.g., adult users). As another example, a user may have paid for a limited level of service (e.g., a basic level of service as compared with, for example, a full access package of services) and as such the service may be restricted or limited for some users based on the level of service. Similarly, some users may not be subject to some restrictions and as such display parameter restrictions may not apply to these users.

In step 1354, the display parameters and/or restrictions are incorporated into a network accessible user profile. Additionally or alternatively in some embodiments, one or more display parameter files can be generated and stored remote from the playback device that can be forwarded to the playback device for use in displaying content. The options associated with the display parameters are also stored in the user profile (and/or display parameter file(s)) for at least some of the display parameters. Further in some instances, content associated with the options may further be identified and links or locations where the content is stored can similarly be stored. For example, a display parameter may be for background graphics of a menu to be displayed, and multiple options for different background graphics can be identified. Each graphics option can further be associated with a graphics file that contains display graphics for different backgrounds. The links or locations of the graphics files can be stored along with the display options, in some instances. In other instances, however, the content associated with the options can be determined prior to forwarding the display parameters and options so that a most current content or location of content can be utilized.

In step 1356, a user account is accessed in those instances where the account is not already accessed, and the user profile and/or display parameter files are retrieved. In step 1360 it is determined whether a medium or content identification is received from the playback device identifying the medium and/or content to which customization is attempting to be applied. In those instances where an identification is not received, a request for the medium and/or content identification is forwarded to the playback device or user. In step 1362 a request is forwarded requesting an identification of the medium and/or content.

In step 1364, information associated with the identified medium and/or content is accessed. In step 1366, a determination is made whether additional display parameters are associated with the identified medium and/or content. In some instances the search for associated displayed parameters can be limited to the local server. In other instances, however, a search of other sources can be conducted in attempts to identify additional display parameters. For example, a content owner can be identified from the medium and/or content identification and a remote server or other source operated by or on behalf of the content owner may be accessed in attempts to identify additional display parameters or restrictions. A search of the Internet may be conducted in some embodiments based on the identification in attempts to identify sources for display parameters and/or restrictions.

When it is determined in step 1366 that there are no additional display parameters the process skips to step 1376. Alternatively, step 1370 is entered to determine whether display parameters and/or restrictions associated with the identified medium and/or content conflict with other display parameters or restrictions (such as those identified in step 1352). When there are no conflicting display parameters or restrictions the process skips to step 1374. In those instances where conflicts are detected step 1372 is entered to identify which of the conflicting display parameters or restrictions has priority. The determination of priority can include a numerical rating system associated with each display parameter or restriction with, for example, a higher number being associated with a higher priority parameter or restriction, the priority can be based on a source of the parameter or restriction, or other such determinations.

In step 1374, those priority display parameters and/or restrictions are stored, for example, in the user profile and/or a parameter file. The storing in some instances can include overwriting parameters or restrictions previously stored. In step 1376, the display parameters and/or restrictions are forwarded to the playback device for use by a user in customizing the display of at least some content. In some embodiments, one or more display parameter files can be generated and stored remote from the playback device and/or forwarded to the user for use in displaying content. Typically, the options associated with the display parameters are also forwarded to the user for at least some of the display parameters, and in some instances, content associated with the options may further be forwarded to the user. This allows the user to select a desired option when multiple options are available and to access additional content that might be associated with the option. For example, a display parameter may be for background graphics of a menu to be displayed, and multiple options for different background graphics can be identified. Further, a graphics file that contains graphics for different backgrounds associated with the options can be provided and/or identified and forwarded to the user. In other instances, the additional content may not be provided but instead a link or location of an alternate source is provided allowing the user to access the alternate source for the additional content.

Figure 14:
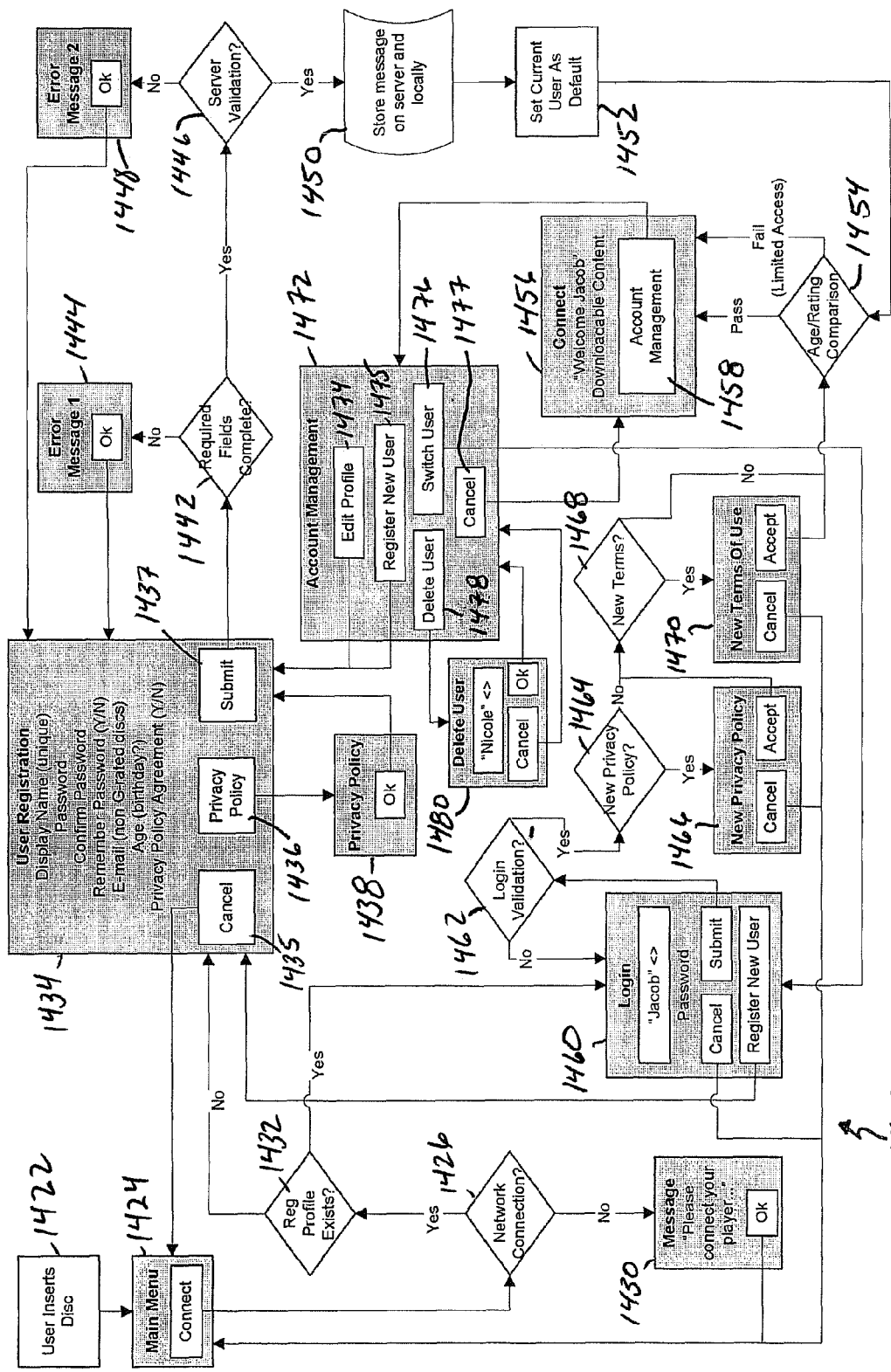
FIG. 14 depicts a simplified flow diagram of a process according to some embodiments for logging in to a remote source.

As described above, in some instances a user in accessing a remote source logs in or accesses a user account. FIG. 14 depicts a simplified flow diagram of a process 1420 according to some embodiments for logging in to a remote source, such as server 150. In some embodiments, the process 1420 is activated at optional step 1422 upon the detection that a medium 122 has been inserted into the playback device. In step 1424, a main medium menu or a connection menu is displayed. In those instances where a main menu is displayed a connection option is provided. Upon activation of the connect option the process 1420 continues to step 1426 where a determination is made whether the playback device is connected with the network 142 or is in communication with a device that is connected with the network. In those instances where the network connection is not available an error message is generated in step 1430 indicating that the connection is not active or available and suggesting the user connect the playback device with the network and attempt to reconnect.

When a network connection is detected step 1432 is enter where it is determined whether a registered user and/or playback device profile exits. In those instances where a profile is not registers step 1434 is entered requesting that the user register with the remote source. This registration can include one or more requests from the remote source for user, playback device and/or other relevant information, such as a user name, password, confirmation of a password, whether the password should be remembered, and E-mail address (which may be requested when associated with limited content, certain kinds of content or mediums, such as movie content that is not rated at a "G" rating), age or birth date, a privacy policy acceptance and/or other such information. In some embodiments the user is provided in step 1434 with additional options, such as a "cancel" option 1435 that would return the user to the main menu, a privacy policy option 1436 that returns a policy of privacy to the user for review in step 1438, and a submit option 1437 that transfers the information to the remote source and causes the process 1420 to transition to step 1442. In step 1442 the supplied information is evaluated, for example, to determine whether required fields are filled in and/or valid. Step 1444 is entered when a required field is not filled in or invalidly filled in (which might include an indication that a designated user name is already in use, password is invalid, data needs to be entered in a field or other such errors) where an error message is generated and the process returns to step 1434.

When it is determined in step 1442 that the user registration is properly provided step 1446 is entered to determine whether a server validation is received. When a server validation is not identified an error is generated in step 1448 and the process returns to step 1434. Alternatively, step 1450 is entered where the user information is stored, typically at the server or a database accessible by the server. In some embodiments, the playback device similarly records the information. In optional step 1452, the current user is set as a default user. In step 1454 it is determined whether the user should be granted access to connect with the server. This determination can be based on a user's age, the content of the medium 122, or other such factors. In some instances, when it is determined that the user should not be granted access, an error message is generated and the process returns to the main menu. In other instances, it may be determined in step 1454 that the user should be granted access but the access should be limited, for example based on the user's age, the rating of the content (e.g., "G" rating) or other such conditions. When access or limited access is to be granted the process continues to step 1456 where the user is recognized and provided with access to additional content, display parameters, and the like.

Returning to step 1432, when it is determined that a registered user and/or playback device profile exits the process 1420 continues to step 1460 that requests the user login. The login can be substantially any login, and in some instances has the user enter a user name and password. The login provided in step 1460 can include a cancel option to return to step 1424, a register new user option that directs the process 1420 to step 1434, and a submit option that directs the user to step 1462 where a validation of the login is determined. When the validation fails the process returns to step 1460, or to step 1424 (for example, when a predefined number of attempts to login are tried). In step 1464 it is determined whether a new privacy policy has been issued since the user last accepted the privacy policy. When a new privacy policy exists step 1466 is entered requesting that the user accept or decline the new privacy policy. Should the user decline the new policy the process 1420 terminates and/or returns to step 1424. When a new policy does not exit or once the user accepts a new policy step 1468 is entered to determine whether new terms or conditions for access and use have been implemented since registration and/or a user's last login. Step 1470 is entered when one or more new terms or conditions exist allowing the user to accept or decline the terms. Should the user decline the process terminates or returns to step 1424. Alternatively, when the user accepts the terms in step 1470 or when it is determined in step 1468 that no new terms or conditions exist, the process 1420 continues to step 1454 to determine whether the user should be granted access.

As described above, once it is determined in step 1454 that the user should be granted access or limited access step 1456 is entered and the user is recognized and provided with access to additional content, display parameters, and the like. In some embodiments, the user is further provided with an account management option 1458 causing the process 1420 to transition to step 1472 where the user is provided with options in managing a user account and/or profile. These options can include an option to edit a profile 1474 or register a new user 1475, both of which direct the process to step 1434, a switch user option 1476 that directs the process back to step 1460, a cancel option 1477 that returns the process to step 1456 providing the user with access to content, a delete a user option 1478 or other such options. Should the delete a user option be selected, the process 1420 in some embodiments continues to step 1480 where a request to identify the user to be deleted is issued.

Figure 15:
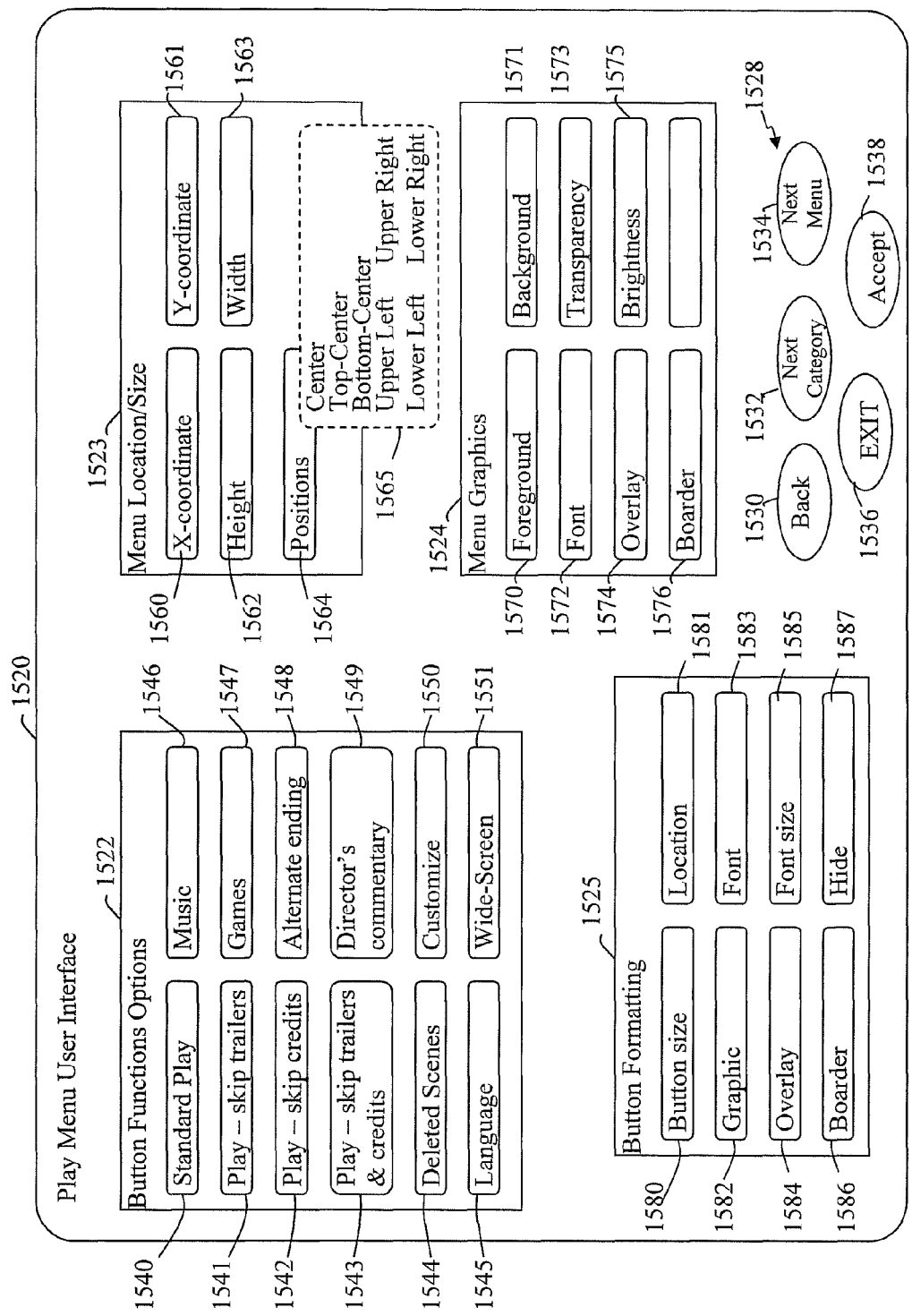
FIG. 15 depicts a simplified example of a graphical user interface according to some embodiments that allows a user to customize at least a portion of a menu, such as one of the playback menus depicted in FIGS. 3-6, by defining control options or buttons available through the menu.

Some embodiments further provide one or more user interfaces and/or application interfaces that aid users in implementing the customization. FIG. 15 depicts a simplified example of a graphical user interface 1520 according to some embodiments that allows a user to customize at least a portion of a menu, such as one of the playback menus depicted in FIGS. 3-6, by defining control options or buttons available through the menu. The user interface 1520 includes multiple categories 1522-1325 and control options or buttons 1528. Four categories are shown in the example user interface 1520 of FIG. 15, however, substantially any number of categories can be provided, with substantially any number of relevant display parameters being included in the categories. As an example, the user interface 1520 can include categories for button functions 1522, menu location and/or sizing 1523, menu graphics 1524 and button formatting 1525. Other categories could be included in the user interface 1520, and in some embodiments other categories may be accessed through the use of the control buttons 1528, such as through a next category option 1532.

In each category 1522-1325 includes one or more display parameters. For example, the button function category 1522 can include display parameters to designate what buttons and the associated functions to be included in a play menu. Some of the buttons that can be selected to be incorporated in the displayed menu or removed from the displayed menu could include a standard play 1540 that when selected through the play menu would cause a playback device to playback content from a beginning (e.g., with movie content, the standard play would play previews, the main movie(s), and the credits), play skip trailers 1541 that would skip previews and proceed to the main content (e.g., movie content), play skip credits 1542, play skip trailers and credits 1543, deleted scenes 1544 that would incorporate scenes during playback that were deleted during editing when available, language 1545 that could designate the audio language, language of sub-titles and/or the language used in the text of the displayed menu, music 1541 that could allow a user to adjust the music (e.g., adjusting a general volume, adjusting the base, or the like) and/or to designate music to be played back while the associated menu is being displayed, games 1547 that would display a menu of game options available on the medium or accessible over a network should a network connection be available, alternate ending 1548 that when selected allows a user to select a different ending, a director's commentary 1549 that causes text and/or audio of a directors comments to be played back, for example, while the movie is playing back, customize 1550 that would activate the user interface 1520, a wide screen aspect ratio 1551 that would playback the content using a wide screen (e.g., 16×9) format. The selection of the button may activate the button to be included when the menu is displayed or removed from the menu based on whether the parameters previous state. In some implementations, a button can activate a pull-down menu with further options, activate a different user interface with further options or other such methods of displaying further options or linking to related options.

Display parameters for menu locations can also be selected in the menu location and/or size category 1523. Some of the parameters might include an x-coordinates parameter option 1560 that would allow a user to designate an x-coordinate for the location of a menu (e.g., the x-coordinate of the upper left displayed corner of the displayed menu, which may be designated by pixel count, inches or other such coordinates), a y-coordinate parameter option 1561, a height parameter option 1562 that allows the user to designate a height of the displayed menu, a width parameter option 1563 to define a width of the displayed menu and other such relevant options. Some embodiments can include predefined location designation 1564, which in some implementation is displayed in a pull-down menu 1565 and includes positions such as but not limited to, center, center-top, center-bottom, upper left, upper right, lower left, lower right, or other such locations.

The menu graphics category 1524 can identify display parameters associated with the graphics utilized when displaying a menu. Some of the graphics display parameters can include a foreground parameter option 1570, a background parameter option 1571, a font parameter option 1572, a transparency parameter option 1573 that defines how transparent a menu is when displayed (for example, when displaying while content continues to be played back it may be advantageous to customize the menu to be fairly transparent so that the content can continue to be seen while the menu is displayed), an overlay parameter option 1574 that would designate whether the menu is displayed over the content, a brightness parameter option 1575 that would designate the brightness of the menu when displayed, a border parameter option 1576 that allows the user to configure the border, and other such parameter options.

The button formatting category 1525 can designate display parameters associated with customizing the appearance of buttons displayed within the menu. Some examples of button formatting parameter options can include a button size parameter option 1580 (which might activate another menu of display parameters, such as X/Y coordinates, predefined sizes, and other such parameters, and in some instances the sizes available may be limited by the size of the menu selected through the menu location and size category 1523, however, in some instances, the menu size may adjust to accommodate the selected size of buttons based on the number of buttons; further the font size may be restricted depending on the size of the buttons or alternatively the button size may be restricted based on the size font selected), a location parameter option 1581 to designate a location of the buttons selected through the button function category 1522, a graphics parameter option 1582 to designate graphics associated with one or more of the buttons, a font parameter option 1583 to designate the font to be used in displaying text on the buttons, an overlay parameter option 1584, a font size parameter option 1585, a border parameter option 1586, a hide parameter option 1587 that would cause one or more selected buttons to be hidden (for example, when certain conditions are met, such as hiding a customize button while a fast-forward button is selected), and/or other such display parameters.

The display parameters and categories depicted in FIG. 15 are examples of some of the display parameters that might be customizable through some embodiments, and examples of how some display parameters can be grouped or categorized. It is noted, however, that the example of FIG. 15 should not be viewed as the only display parameters and/or categories. As described above, the selection of a button within the user interface 1520 can activate a pull-down menu with further options, activate a different user interface with further options or other such methods of displaying further options or linking to related options. Further, such defined customizations can be stored locally or at a remote location that can be accessed, for example, over the network 142.

The control options or buttons 1528 provide the user with navigation through the user interface and customization available. Some examples of control buttons can include a back button 1530 that transitions the user interface to a previous menu (e.g., to the play menu 522 of FIG. 5 when a customization button was selected from the menu 522 causing the user interface 1520 to be displayed. The next category control button 1532 can transition the user interface to display one or more other categories associated with, for example, the play menu in the example of FIG. 15. In some instances, the next category control button 1532 is displayed when additional categories are available and not displayed or grayed out and not selectable in those instances where further categories are not available. A next menu control option 1534 can be included that transitions the user interface 1520 to display categories and/or display parameters for other menus defined on the medium. An exit control button 1536 can be provided to allow the user to exit the user interface without making further changes to parameter options. An accept control button 1538 to cause selected changes of the display parameters to be accepted and stored for use when displaying the associated menu. Other such control buttons can be included.

As described above, the customization provided by some embodiments is implemented at least in part through the medium 122 upon which the content to be played back is recorded. In some instances, the medium includes software, executables, scripts and/or other such applications that are utilized by the playback device to implement customization. In some embodiments, software recorded on the medium 122 is implemented by the controller 124 or processor of the controller. As one example, a script can be retrieved from the medium to implement an application program interface that allows the user to access the listing of display parameters to customize parameters (e.g., such as implementing the user interface 1520 of FIG. 15). Further, the medium is configured based on display parameters that are definable by the user in customizing the playback and the displaying of the content from the medium and/or additional content that may be played back with the content from the medium (e.g., additional content retrieved from over the network 142). Some embodiments further incorporate definitions for display parameters, and in some instances may include multiple definitions for a single display parameter.

Figure 16:
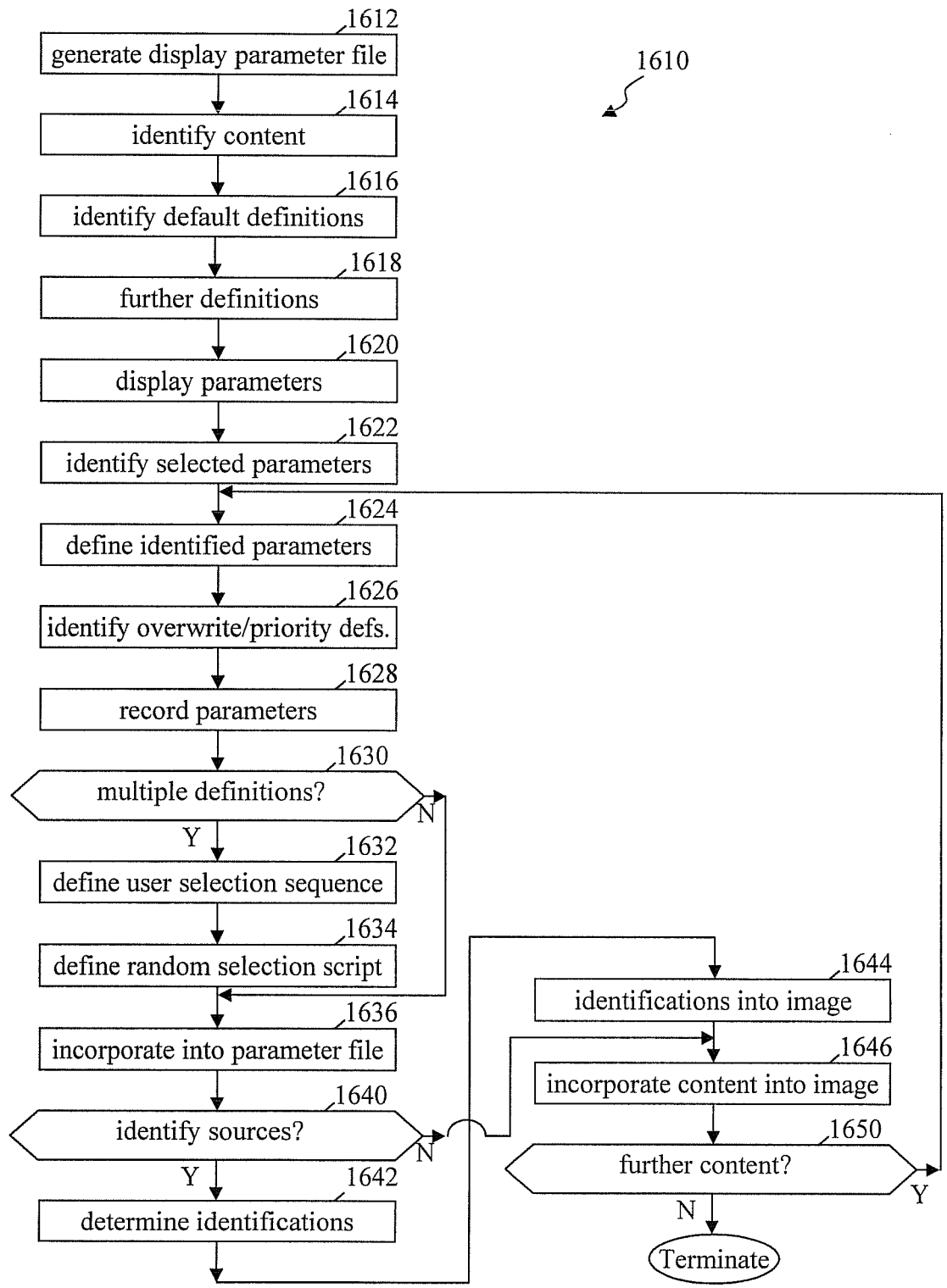
FIG. 16 depicts a simplified flow diagram of a process according to some embodiments for use in generating a media image that is used in recording, stamping and/or producing portable storage mediums to be distributed, for example to the public, that are capable of allowing a user to customize the display and/or playback of the content from the medium.

FIG. 16 depicts a simplified flow diagram of a process 1610 according to some embodiments for use in generating a media image that is used in recording, stamping and/or producing portable storage mediums to be distributed, for example to the public, that are capable of allowing a user to customize the display and/or playback of the content from the medium. In step 1612, an initial display parameter file is generated. In step 1614, content to be recorded to the portable storage medium is identified and retrieved. The content can include audio-visual content, audio content, still picture content, and/or other relevant multimedia content, textual content, data, graphics, and other relevant content to be played back. Additional content can also be identified, such as menu content, graphics content, scripts, executables, references to or identification of sources for content and/or display parameter data, and other relevant content.

The process 1610 continues to step 1616 where default definitions for display parameters, default options for display parameters and/or default restrictions are identified relative to the content. In step 1618, it is determined whether further definitions and/or display parameters are to be incorporated into the media image. In some embodiments, the content owners may provide some display parameters, restrictions and associated definitions that is supplied to a content distributed that generates and/or produces the media image that is stamped or recorded to the portable storage medium for distribution, and allows or relies on the distributor to further provide additional customization capabilities. For example, the content owner (e.g., a movie studio) may provide display parameters associated with additional content that can be utilized with, for example, a movie content and associated definitions for the cooperation of the additional content with the movie content, while the distributor generates display parameters associated with the appearance of menus, language selection, formatting, aspect ratios, graphics, sub-title content, and other such display parameters. Further, the content owner may provide some restrictions, such as restricting some content (e.g., content from another movie studio) from being associated with the content of the medium.

In step 1620 one or more available display parameters, options and/or restrictions are displayed. Selected display parameters, options and/or restrictions are identified in step 1622. Once additional display parameters, options and/or restrictions are identified, the process 1610 continues to step 1624 where the identified parameters, options and/or restrictions are defined. Multiple definitions can be included, and in some instances, options are generated and associated with a display parameter when multiple definitions are available. In some embodiments, steps 1620, 1622 and 1624 are repeated multiple times allowing appropriate selections to be made. Further in some instances, the available display parameters, options and/or restrictions are grouped or organized according to categories and steps 1620, 1622 and 1624 can be repeated for one or more of the categories.

In step 1626, specified definitions for parameters, options and/or restrictions are identified that are to overwrite default definitions or have priority over conflicting default definitions. In step 1628, the default and/or specified definitions for the display parameters, options and/or restrictions are stored and associated with the appropriate display parameters, options and/or restrictions. In step 1630, it is determined whether multiple definitions exist for a single display parameter. In those instances where each display parameter is associated with a single definition the process 1610 skips to step 1636. Alternatively, step 1632 is entered and a user selection sequence or script is defined that can be activated by a user accessing a medium when customizing to allow the user to identify and select one of the multiple definitions. In some embodiments, the process 1610 further includes optional step 1634 that defines a random selection script and/or a sequential selection script that when activated (for example, when a user does not select one of the multiple definitions for a display parameter) to cause a random or sequential selection from the multiple definitions as described above. The defined user selection, random selection and/or sequential selection script(s) are further associated with the display parameter and multiple definitions. In step 1636, the display parameters, options, restrictions and definitions are incorporated into one or more parameter files and the parameter file(s) are incorporated into the media image.

In step 1640 it is determined whether one or ore remote sources are to be identified. The remote sources can provide a user with additional display parameters, options, and/or restrictions. Further, some sources may provide additional content that can be utilized with the content incorporated in the media image to be recorded to the portable storage medium. When identification and/or links to remote sources are not to be incorporated into the media image the process 1610 skips to step 1646. Alternatively, step 1642 is entered where source identifications are determined. The source identifications can include links, URLs, names of sources, or other such identifications. In step 1644, the source identifications are incorporated into the media image. In step 1646 the content is incorporated into the media image that can be used in stamping or otherwise producing mediums for distribution. In step 1650 it is determined whether further content is to be incorporated into the media image. In those instances where additional content is to be incorporated, the process 1610 returns to step 1624. Alternatively, the process terminates.

The present embodiments advantageously provide for the customization in accessing, rendering and/or playing back content. Some embodiments provide methods of customizing displayed content from a portable storage medium. These methods can determine that a command to customize display parameters is received, identify a plurality of available display parameter options, identify one or more customizable parameter options of the plurality of available display parameter options, and display at least one of the one or more customizable parameter options. Further, an entry can be detected to alter a first customizable parameter option from a first state to a second state; store the second state of the first customizable parameter option. A portable storage medium defined default display parameter can be identified that is associated with the first customizable parameter option; and display content retrieved from the portable storage medium while applying the first customizable parameter option according to the second state in place of the default display parameter.

Additional embodiments provide methods of playing back content. Some of these methods can receive a request from a remote player device to forward a display parameter, identify one or more of a plurality of display parameters associated with the request, identify a plurality of associated definitions for each of the one or more plurality of display parameters, and communicate the one or more display parameters and the associated plurality of definitions to the remote player device.

Further embodiments provide methods of customizing playback of content. Some of these methods identify a first multimedia content stored on a portable storage medium, identify one or more customizable display parameters of a plurality of display parameters associated with a first menu defined on the portable storage medium, display a listing of at least a first display parameter of the one or more display parameters, detect a command to alter a state of the first display parameter, store a change of the state of the first display parameter from a first state to a second state, and display the first menu applying the second state of the first display parameter.

Still further embodiments provide methods of customizing a display of content by identifying one or more control options that are defined on a portable storage medium and are to be displayed; identifying a plurality of display parameters and associated plurality of default parameter definitions including a first default parameter definition for the plurality of display parameters stored on the portable storage medium, where the plurality of display parameters define how the one or more control options are to be displayed; determining whether a customized parameter definition for a first display parameter is defined and associated with displaying the one or more control options; configuring a graphical representation of the one or more control options applying the customized parameter definition for the first display parameter in place of the first default parameter definition when the customized parameter definition is defined; and configuring a default graphical representation of the one or more control options applying the first default parameter definition defined on the portable storage medium when the customized parameter definition is not defined.

Some embodiments provide methods of displaying content. These methods identify a menu on a portable storage medium and defined by the portable storage medium to be displayed; identify a plurality of display parameters and default parameter definitions defined on the portable storage medium; access additional display parameters; determine whether one or more of the additional display parameters are defined to be utilized in place of one or more of the default display parameters; identify one or more additional display parameter definitions when the one or more additional display parameters are defined to be utilized in place of one or more of the default display parameters; and display the menu according to at least the one or more additional display parameter definitions when the one or more customized display parameter definitions are defined.

Other embodiments provide methods of displaying content that identify a menu on a portable storage medium and defined by the portable storage medium to be displayed; identify, on the portable storage medium, a plurality of display parameters and a plurality of default parameter definitions, with at least one default parameter definition being associated with a corresponding one of the plurality of display parameters such that each of the plurality of display parameters are associated with at least one of the default parameter definitions; access additional parameters definitions; determine whether one or more of the additional parameters definitions are defined to be utilized in place of one or more of the default parameters definitions; identify one or more additional parameter definitions when the one or more additional parameters definitions are defined to be utilized in place of one or more of the default parameter definitions; and display the menu according to at least the one or more additional parameter definitions in response to determining that the one or more additional parameter definitions are defined to be utilized in place of one or more of the default parameter definitions.

Still further, methods are provided according to some embodiments of distributing multimedia content stored on a portable storage medium. Some of these methods retrieve content; identify definitions defined within the content of display parameters of the content; display available display parameters; identify a selection of one or more of the displayed available display parameters; receive one or more additional definitions that are associated with the one or more of the available display parameters; store the definitions and additional definitions for the display parameters and the association of the definitions with the appropriate parameters; write the content, the definitions and the one or more additional definitions to an image file.

Additionally, some embodiments provide methods of displaying multimedia content to be displayed in relation with a portable storage medium. These methods retrieve content from a first portable storage medium; identify, as specified on the first portable storage medium, display parameters to be applied in displaying the content from the portable storage medium; determine, in response to the identifying the display parameters, whether one or more customized definitions are defined to be applied to one or more of the display parameters; determine whether the one or more customized definitions defined for the one or more of the display parameters are to be applied in displaying the content retrieved from the portable storage medium; and display the content from the first portable storage while applying the one or more of the customized definitions defined for the one or more of the display parameters in place of one or more medium defined display parameter definitions defined on the medium.

Still other embodiments provide systems that play back content. Some of these system comprise a processor, a portable storage medium interface that accesses and retrieves at least code executable by the processor, a network interface coupled with an external network, and digital storage coupled with the processor, such that the digital storage is configured to digitally store at least a portion of the code retrieved from the portable storage medium. The processor accesses and executes the code retrieved from the portable storage medium to, at least in part, identify content to be rendered, through the system, in association with the first portable storage medium directly accessed by the system; identify one or more customizable display parameters to be applied in displaying the identified content; receive a first definition, following the identification of the one or more customizable display parameters, for at least a first customizable display parameter of the one or more customizable display parameters; and cause the first definition for the first customizable display parameter to be stored on the digital storage in association with the first customizable display parameter such that the first definition is applied by the system in rending the content relative to the first customizable display parameter.

While the invention herein disclosed has been described by means of specific embodiments and applications thereof, numerous modifications and variations could be made thereto by those skilled in the art without departing from the scope of the invention set forth in the claims.

What is claimed is:

1. A method of playing back content to be played back in association with a portable storage medium, the method comprising the following processor implemented steps:
receiving a command to customize display parameters;
accessing a first portable storage medium;
identifying one or more customizable display parameters, defined on the first portable storage medium, that can be applied while displaying a first content associated with the first portable storage medium;
displaying at least one of the one or more customizable display parameter;
detecting a designation of a first definition for a first customizable display parameter, of the displayed at least one of the one or more customizable display parameter, alter a state of the first customizable display parameter from a first state to a second state;
storing the first definition in response to detecting the designation of the first definition altering the state of the first customizable display parameter to the second state;
displaying, through a playback device, the first content in association with the first portable storage medium while applying the first definition of the first customizable display parameter according to the second state;
identifying additional customizable display parameters from a source other than the first portable storage medium;
receiving a selection of a second customizable display parameter of the identified additional customizable display parameters;
receiving a second definition for at least the second customizable display parameter;

causing the second definition for the second customizable display parameter to be stored and associated with the second customizable display parameter;

where the displaying the first content comprises displaying the first content while applying the first definition of the first customizable display parameter according to the second state and the second definition of the second customizable display parameter;

directly accessing a second portable storage medium;

displaying a second content retrieved from the second portable storage medium while applying the first customizable display parameter according to the second state, where the content retrieved from the second portable storage medium is different than the first content from the first portable storage medium;

identifying a content owner of the second content retrieved from the second portable storage medium;

determining whether the content owner is also the owner of the first content associated with the first portable storage medium; and wherein the displaying the second content comprises displaying the second content retrieved from the second portable storage medium while applying the first customizable display parameter according to the second state when the content owner of the second content retrieved from the second portable storage medium is also the owner of the first content associated with the first portable storage medium.

2. The method of claim 1, further comprising:
displaying the first content, in association with accessing the first portable storage medium, while applying the first definition for the first customizable display parameter in place of a default definition defined, prior to receiving the first definition for the first customizable display parameter, for the first customizable display parameter.

3. The method of claim 2, wherein the identifying the one or more customizable display parameters to be applied in displaying the identified first content comprises searching local memory of the playback device and the first portable storage medium for the one or more customizable display parameters.

4. The method of claim 3, further comprising:
determining whether a network connection is active providing access over a network to one or more remote sources;
accessing a remote source in response to determining that the network connection is active;
receiving, in response to accessing the remote source, one or more additional definitions, from the remote source, for the additional customizable display parameters including the second definition; and
causing the one or more additional definitions for the additional customizable display parameters to be applied by the playback device in the displaying the first content.

5. The method of claim 2, further comprising:
identifying additional content accessible from a source other than the first portable storage medium, where the additional content is designated to be displayed in cooperation with content recorded on the first portable storage medium; and
causing the first definition for the first customizable display parameter to be applied by the playback device in displaying the additional content in cooperation with the content recorded on the first portable storage medium.

6. The method of claim 1, further comprising:
receiving a third definition, following the identification of the one or more customizable display parameters, for at least a third customizable display parameter of the one or more customizable display parameters; and
causing the third definition for the third customizable display parameter to be stored on the playback device in association with the third customizable display parameter such that the third definition is to be applied by the playback device such that a third content associated with the first portable storage medium is not displayed when the third content would have otherwise been displayed when the third definition for the third customizable display parameter is not applied.

7. The method of claim 1, further comprising:
receiving, over a network from a remote source, the additional customizable display parameters, comprising a third customizable display parameter that is different than customizable display parameters accessible from local memory of the playback device and recorded on the medium;
receiving a third definition, following the receiving of the additional customizable display parameters, for at least the third customizable display parameter of the additional customizable display parameters; and
causing the third definition for the third customizable display parameter to be stored on the playback device in association with the third customizable display parameter such that the third definition is applied by the playback device in the displaying the first content relative to the first customizable display parameter.

8. A method of playing back content to be played back in association with a portable storage medium, the method comprising the following processor implemented steps:
receiving a command to customize display parameters;
accessing a first portable storage medium;
identifying one or more customizable display parameters, defined on the first portable storage medium, that can be applied while displaying a first content associated with the first portable storage medium;
displaying at least one of the one or more customizable display parameter;
detecting a designation of a first definition for a first customizable display parameter, of the displayed at least one of the one or more customizable display parameter, alter a state of the first customizable display parameter from a first state to a second state;
storing the first definition, in response to detecting the designation of the first definition altering the state of the first customizable display parameter to the second state; and
displaying, through a playback device, the first content in association with the first portable storage medium while applying the first definition of the first customizable display parameter according to the second state;
wherein the identifying the one or more customizable display parameters comprises:
accessing a user profile;
identifying at least a second customizable display parameter and a second definition as specified in the user profile;
the displaying the first content comprises displaying the first content in association with the first portable storage medium while applying the first definition of the first customizable display parameter according to the second state and the second definition of the second customizable display parameter;

accessing a remote source over a distributed network to gain access to a remote user profile from the remote source;

identifying at least a third customizable display parameter and a third definition as specified in the remote user profile; and the displaying the first content comprises displaying the first content in association with the first portable storage medium while applying the first definition of the first customizable display parameter according to the second state, the second definition of the second customizable display parameter and the third definition of the third customizable display parameter.

9. The method of claim 8, wherein the identifying the one or more customizable display parameters comprises:

searching the first portable storage medium being directly accessed by the playback device;

identifying, as a result of the searching of the first portable storage medium, a second remote source designated on the first portable storage medium;

accessing the second remote source over the distributed network;

identifying, through the remote source, a fourth customizable display parameter;

receiving, from the remote source, a fourth definition for the fourth customizable display parameter; and the displaying further comprises displaying the first content applying the fourth definition for the fourth customizable display parameter instead of an alternative definition defined on the first portable storage medium for the first customizable display parameter.

* * * * *